United States Patent
Nicolosi et al.

(10) Patent No.: US 12,407,246 B2
(45) Date of Patent: Sep. 2, 2025

(54) RESONANT SWITCHED CAPACITOR CONVERTER CONTROL MODULE AND METHOD WITH ZERO CURRENT SWITCHING CONTROL

(71) Applicant: STMicroelectronics S.r.l., Agrate Brianza (IT)

(72) Inventors: Alessandro Nicolosi, Dresano (IT); Alessandra Farina, Oleggio Castello (IT); Edoardo Bonizzoni, Pavia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 311 days.

(21) Appl. No.: 18/300,945

(22) Filed: Apr. 14, 2023

(65) Prior Publication Data
US 2023/0353052 A1  Nov. 2, 2023

(30) Foreign Application Priority Data
Apr. 27, 2022 (IT) .................. 102022000008339

(51) Int. Cl.
*H02M 3/00* (2006.01)
*H02M 1/00* (2006.01)
*H02M 3/07* (2006.01)

(52) U.S. Cl.
CPC .......... *H02M 3/01* (2021.05); *H02M 1/0058* (2021.05); *H02M 3/07* (2013.01)

(58) Field of Classification Search
CPC . H02M 3/07–078; H02M 3/01; H02M 1/0095
See application file for complete search history.

(56) References Cited

U.S. PATENT DOCUMENTS

| 11,923,786 B2 * | 3/2024 | Ilic .................. H02M 1/083 |
| 2020/0212797 A1 * | 7/2020 | Nogawa ............ H02M 3/01 |
| 2023/0024198 A1 * | 1/2023 | Kawano ............ H02M 3/158 |

FOREIGN PATENT DOCUMENTS

WO    2021024255 A1    2/2021

OTHER PUBLICATIONS

Y. Guan et al., "A Soft-Switching High Step-Down Regulated DCăDC Converter: Topology Construction and Contril Method," in IEEE Transactions on Power Electronics, vol. 40, No. 4, pp. 4952-4968, Apr. 2025, (Year: 2025).*

(Continued)

*Primary Examiner* — Peter M Novak
(74) *Attorney, Agent, or Firm* — Slater Matsil, LLP

(57) ABSTRACT

A control module, for a resonant switched-capacitor converter with an inductor, includes a controller stage, an input stage generating a control signal indicating a control quantity, a delay stage generating a duration signal indicating a time quantity, and a circuit indicating zero crossings of the inductor current. If the control quantity is variable, the input stage clamps the control quantity to a control threshold. When in normal mode, the controller stage controls the converter to carry out a phase sequence with timings that depend on the zero crossings and the time quantity, so the converter generates an output current that depends on the time quantity and is prevented from dropping below a minimum current. If the output voltage reaches an upper threshold, the controller stage switches into pulse-skipping mode to suspend the phase sequence, and resumes the phase sequence after the output voltage drops to a lower threshold.

20 Claims, 11 Drawing Sheets

(56) References Cited

OTHER PUBLICATIONS

Sane, K., et al., "Performance of a High-Efficiency Switched-Capacitor-Based Resonant Converter With Phase-Shift Control," IEEE Transactions on Power Electronics, vol. 6, No. 2, Feb. 2011, 12 pages.

Sano, K., et al., "Improving Dynamic Performance and Efficiency of a Resonant Switched-Capacitor Converter Based on Phase-Shift Control," 2009 IEEE Energy Conversion Congress and Exposition, Sep. 20, 2009, 8 pages.

* cited by examiner

RESONANT SWITCHED CAPACITOR CONVERTER CONTROL MODULE AND METHOD WITH ZERO CURRENT SWITCHING CONTROL

CROSS-REFERENCE TO RELATED APPLICATIONS

This application claims the benefit of Italian Patent Application No. 102022000008339, filed on Apr. 27, 2022, which application is hereby incorporated herein by reference.

TECHNICAL FIELD

The disclosure relates to a control module for a resonant switched-capacitor converter with improved efficiency at low load and to a method for controlling the resonant switched-capacitor converter.

BACKGROUND

As it is known, the so-called switched-capacitor converters (SCCs) allow to regulate a direct-current (DC) output voltage $V_{out}$, starting from a DC input voltage $V_{in}$, by transferring energy (charge) between capacitors. Furthermore, among the switched-capacitor converters, there are known the so-called resonant switched-capacitor converters (reSCC), which provide for the presence of an inductor, which forms, along with a capacitor, a resonant circuit, thereby allowing to overcome some of the drawbacks of the purely capacitive switched-capacitor converters, such as the need for the input voltage $V_{in}$ to be greater than a threshold (as an example, in the so-called 2:1 topology, the requirement $V_{in}>2*V_{out}$ must be met). In addition, the presence of a resonant circuit allows to transfer the charge in an efficient way, because it allows to implement a zero-voltage switching of the transistors, i.e. it allows to reduce the $V_{DS}$ voltage of the transistors during the switching. In addition, since the resonant circuit is driven at a frequency close to the resonance frequency, the inductor can have a very low inductance.

As an example, FIG. 1A shows a converter 1, which is a resonant switched-capacitor DC-DC converter.

The converter 1 includes a first, a second, a third and a fourth transistor $S_1$, $S_2$, $S_3$, $S_4$, which are NMOS transistors.

The first, the second, the third and the fourth transistor $S_1$-$S_4$ are connected in cascade. In particular, the drain terminal of the first transistor $S_1$ forms an input node $N_{IN}$, which is configured to be set to the input voltage $V_{in}$ (referred to ground) whereas the source terminal of the first transistor $S_1$ forms a first intermediate node $N_1$ and is connected to the drain terminal of the second transistor $S_2$. The input voltage $V_{in}$ is generated by an input source 2.

The source terminal of the second transistor $S_2$ forms an output node $N_{OUT}$ and is connected to the drain terminal of the third transistor $S_3$.

The source terminal of the third transistor $S_3$ forms a second intermediate node $N_2$ and is connected to the drain terminal of the fourth transistor $S_4$, whose source terminal is connected to ground.

The converter 1 further includes a resonant circuit comprising an inductor $L_r$ and a capacitor $C_r$, which are connected in series between the first and the second intermediate node $N_1$, $N_2$. The capacitance of the capacitor $C_r$ may be comprised in the range 10 pF-10 μF; the inductance of the inductor $L_r$ may be comprised in the range 1 nH-10 μH.

The converter 1 further includes an output capacitor $C_0$, which is connected between the output node $N_{OUT}$ and ground. In use, a load 3 is connected between the output node $N_{OUT}$ and ground, in parallel to the output capacitor $C_o$. The average voltage on the output node $N_{OUT}$ represents the average output voltage $V_{out}$.

In order to control the converter 1, a control module (not shown) generates corresponding digital signals $sS_1$, $sS_2$, $sS_3$, $sS_4$. Though not shown, the gate terminals of the first, the second, the third and the fourth transistor $S_1$-$S_4$ are controlled by corresponding signals which respectively depend on the signals $sS_1$-$sS_4$. In particular, by referring as an example to the first transistor $S_1$, when the signal $sS_1$ is respectively equal to '1' or '0', the corresponding signal present on the gate terminal of the first transistor $S_1$ is respectively equal to a voltage $V_{on1}$ or a voltage $V_{off1}$, which are such that the first transistor $S_1$ is respectively on or off; the same applies to the signals $sS_2$, $sS_3$, $sS_4$ and, respectively, the second, the third and the fourth transistor $S_2$, $S_3$, $S_4$. Therefore, by adopting an integer index 'i' (with i=1, 2, 3, 4), when the signal $sS_i$ is respectively equal to '1' or '0', the gate terminal of the i-th transistor $S_i$ is set to a voltage which is respectively equal to $V_{on\_i}$ or $V_{off\_i}$, the values $V_{on\_i}$ or $V_{off\_i}$ being such that the i-th transistor $S_i$ is respectively on (i.e., the voltage gate-source is greater than the threshold) or off (i.e., the voltage gate-source is lower than the threshold). In addition, considered any of the signals $sS_1$-$sS_4$, the durations of the time periods in which the signal is equal to '1' or '0' are respectively designated by $T_{ON}$ and $T_{OFF}$.

This having been said, the signal $sS_2$ is equal to the logic negation of the signal $sS_1$; the signal $sS_4$ is equal to the logic negation of the signal $sS_3$. Therefore, the signals $sS_1$ and $sS_2$ form a first pair of signals sharing the same timing, whereas signals $sS_3$ and $sS_4$ form a second pair of signals sharing a same timing; the second pair of signals is time shifted with respect to the first pair of signals.

Based on the values assumed by the signals $sS_1$-$sS_4$, four phases are possible.

In particular, when the signals $sS_1$ and $sS_3$ are equal to '1', and thus signals $sS_2$ and $sS_4$ are equal to '0', the converter 1 operates in a first phase, shown in FIG. 1A (in which the transistors that are on and the path followed by the current are depicted in bold line). In the first phase, the first and the third transistor $S_1$, $S_3$ are on, whereas the second and the fourth transistor $S_2$, $S_4$ are off. Therefore, by referring to the current $i_L$ to designate the current that flows through the inductor $L_r$, during the first phase the current $i_L$ flows through the first and the third transistor $S_1$, $S_3$ and is delivered to the output capacitor $C_o$ and the load 3.

When the signals $sS_1$ and $sS_3$ are respectively equal to '0' and '1', and thus the signals $sS_2$ and $sS_4$ are respectively equal to '1' and '0', the converter 1 operates in a second phase, shown in FIG. 1B. In the second phase, the first and the fourth transistor $S_1$, $S_4$ are off, whereas the second and the third transistor $S_2$, $S_3$ are on, thereby forming a first closed loop including the second and the third transistor $S_2$, $S_3$, the inductor $L_r$ and the capacitor $C_r$. Therefore, during the second phase the current $i_L$ recirculates in first closed loop, without being delivered to the output capacitor $C_o$ and the load 3.

When the signals $sS_1$ and $sS_3$ are equal to '0', and thus the signals $sS_2$ and $sS_4$ are equal to '1', the converter 1 operates in a third phase, shown in FIG. 1C. In the third phase, the first and the third transistor $S_1$, $S_3$ are off, whereas the second and the fourth transistor $S_2$, $S_4$ are on. Therefore, during the third phase, the current $i_L$ flows through the second and the fourth transistor $S_2$, $S_4$ and is delivered to the output capacitor $C_o$ and the load 3.

When the signals $sS_1$ and $sS_3$ are respectively equal to '1' and '0', and thus the signals $sS_2$ and $sS_4$ are respectively equal to '0' and '1', the converter 1 operates in a fourth phase, shown in FIG. 1D. In the fourth phase, the first and the fourth transistor $S_1$, $S_4$ are on, whereas the second and the third transistor $S_2$, $S_3$ are off, thereby forming a second closed loop including the input source 2, the first and the fourth transistor $S_1$, $S_4$, the inductor $L_r$ and the capacitor $C_r$. Therefore, during the fourth phase the current $i_L$ recirculates in second closed loop, without being delivered to the output capacitor $C_o$ and the load 3.

In practice, the second and the fourth phase allow to adjust the amount of current delivered during the first and the third phase and to regulate any average output voltage $V_{out}$ lower than the input voltage $V_{in}$.

A known control strategy provides for controlling the converter 1 so that it operates according to a sequence of phases formed by the iteration of a succession of the first, the second, the third and the fourth phase, as explained in greater detail in the following. Furthermore, the durations of the third and the fourth phase are respectively equal to the durations of the first and the second phase; in addition, by defining as switching period $T_{SW}$ the aggregated duration of the first, the second, the third and the fourth phase, it is known to provide for two symmetrical semi-periods of duration $T_{SW}/2$, each semi-period consisting of two corresponding phases. In particular, a first semi-period consists of the first and the second phase and has duration equal to $T_{SW}/2$; a second semi-period consists of the third and the fourth phase and has duration equal to $T_{SW}/2$. Furthermore, hereinafter reference is made to the frequencies $f_{SW}$ and $f_{RES}$ to respectively designate the quantity $1/T_{SW}$ (also known as switching frequency) and the resonance frequency of the resonant circuit formed by the inductor $L_r$ and the capacitor $C_r$.

The control module implements a control loop that adjusts the duration of the first phase or the second phase (and thus also of the third phase or the fourth phase) as a function of the difference between an output voltage $v_{out}$, which is the instantaneous voltage on the output node $N_{OUT}$, and a reference voltage $V_{ref}$, this difference being also known as error. To this regard, the control loop has a bandwidth such that the abovementioned duration of the first or second phase depends on the difference between the average output voltage $V_{out}$ (i.e., the average over a switching period $T_{SW}$ of the output voltage $v_{out}$) and the reference voltage $V_{ref}$.

A so-called zero-crossing detector (ZCD) circuit is implemented so as to determine the duration of the second phase (and thus also of the fourth phase).

In detail, as shown in FIG. 2 (wherein, for the sake of simplicity, the symbols showing the first, the second, the third and the fourth transistor $S_1$, $S_2$, $S_3$, $S_4$ don't include the corresponding body diodes), the ZCD circuit (designated by 9) may include a sense resistor $R_{sense}$, a sense capacitor $C_{sense}$ and an amplifier 11.

The sense resistor $R_{sense}$ and the sense capacitor $C_{sense}$ are connected in series so as to form a sense circuit 13, which is connected in parallel to the inductor $L_r$. Furthermore, the terminals of the sense capacitor $C_{sense}$ are respectively connected to the positive and negative input terminals of the amplifier 11, which is configured to generate on its output terminal a signal sZCD.

In use, under the assumption that the time constant of the sense capacitor $C_{sense}$ is much greater than the time constant $T_{SW}$ (with $T_{SW}=1/(2\pi*f_{SW})$), the sense circuit 13 is subjected, to a first approximation, to the same voltage of the inductor $L_r$ (hereinafter referred to as $v_L$) therefore, the sense capacitor $C_{sense}$ is charged by a current which is approximately equal to $v_L/R_{sense}$, which is integrated by the sense capacitor $C_{sense}$; therefore, the voltage on the sense capacitor $C_{sense}$ has the same trend over time as the current $i_L$. In practice, the voltage on the sense capacitor $C_{sense}$ emulates the profile of the current $i_L$; therefore, the signal sZCD is equal to '1' or '0' when the current $i_L$ is respectively positive or negative. Furthermore, whenever the current $i_L$ crosses the zero, the signal sZCD features a corresponding edge.

As an alternative (not shown), the ZCD circuit may be implemented in a manner such that it senses the current flowing through the transistors of the converter 1.

Irrespective of the practical implementation of the ZCD circuit, the known control strategies provide for controlling the converter 1 in alternative ways, depending on whether $V_{out}<V_{in}/2$ or $V_{out}>V_{in}/2$.

In particular, in case $V_{out}<V_{in}/2$, the control strategy provides for controlling the converter 1 so that it operates according to a sequence of phases formed by the iteration of the succession of the first, the second, the third and the fourth phase, such a sequence of phases starting with the first phase, as shown in FIG. 3A, which shows the plots over time of the current $i_L$, of the signal ZCD, of the signal $sS_1$ (coinciding with the signal $\overline{sS_2}$, i.e. with the logic negation of the signal $sS_2$) and of the signal $sS_3$ (coinciding with the signal $\overline{sS_4}$, i.e. with the logic negation of the signal $sS_4$).

In detail, by referring to the durations $T_S'$ and $T_S$ to designate respectively the durations of the first and the second phase (and thus also, respectively, of the third and the fourth phase), the control module imposes the duration $T_S'$ as a function of the difference between the output voltage $v_{out}$ (more precisely, the average output voltage $V_{out}$) and the reference voltage $V_{ref}$, as mentioned before.

Furthermore, by assuming that $f_{SW}>>f_{RES}$ (e.g., $f_{SW}>=10*f_{RES}$) and that, in view of the symmetry of the first, the second, the third and the fourth phase, at steady state the voltage on the capacitor $C_r$ is approximately equal to $V_{in}/2$, it follows that, to a first approximation, during any first phase the current $i_L$ rises, starting from zero, with a slope equal to $[(V_{in}/2)-V_{out}]/L$, with L representing the inductance of the inductor $L_r$. At the end of the first phase, the current $i_L$ assumes a maximum positive value. Furthermore, during any first phase, a charge Q is transferred from the output node $N_{OUT}$ to the load 3 and the output capacitor $C_o$; in particular, by referring to $i_{out}$ to designate the instantaneous current coming from the output node $N_{OUT}$ and directed towards the load 3 and the output capacitor $C_o$, the current $i_{out}$ is equal the current $i_L$.

During any second phase, the current $i_L$ decreases with a slope equal to $-V_{in}/(2L)$, until it reaches the zero value. The second phase precisely ends when the current $i_L$ reaches the zero value, such an event being detected by the ZCD circuit 9.

During any third phase, the current $i_L$ further decreases (i.e., it becomes negative) with a slope equal to $[V_{out}-(V_{in}/2)]/L$. At the end of the third phase, the current $i_L$ assumes a maximum negative value. Furthermore, during any third phase, the charge Q is transferred to the load 3 and the output capacitor $C_o$; in particular, the current $i_{out}$ is equal to $-i_L$.

During any fourth phase, the current $i_L$ rises, starting from the maximum negative value, with a slope equal to $V_{in}/(2L)$, until it reaches the zero value. The fourth phase precisely ends when the current $i_L$ reaches the zero value, such an event being detected by the ZCD circuit 9. The end of the fourth phase coincides with the start of the following first phase.

In greater detail, by assuming $\alpha=2\pi*T_S/T_{SW}$, any second or fourth phase corresponds to a phase angle $\alpha$, whereas any first or third phase corresponds to a phase angle equal to $\pi-\alpha$. Furthermore, the charge transferred to the load 3 and the output capacitor $C_o$ during the first and the third phase, divided by $T_{SW}$, is equal to the current $I_{out}$, i.e. to the average of the current $i_{out}$ over a switching period $T_{SW}$.

In particular, in case $V_{out} > V_{in}/2$, the control strategy provides for controlling the converter 1 so that it operates according to a sequence of phases formed by the iteration of the succession of the fourth, the first, the second and the third phase, as shown in FIG. 3B, which shows the plots over time of the same quantities shown in FIG. 3A.

In detail, the control module imposes the duration $T_S$ of the second and fourth phases, as a function of the difference between the output voltage $v_{out}$ (more precisely, the average output voltage $V_{out}$) and the reference voltage $V_{ref}$.

Furthermore, to a first approximation, during any fourth phase the current $i_L$ rises, starting from zero, with a slope equal to $V_{in}/(2L)$. At the end of the fourth phase, the current $i_L$ assumes a maximum positive value.

During any first phase, the current $i_L$ decreases with a slope equal to $[(V_{in}/2)-V_{out}]/L$, until it reaches the zero value. The first phase precisely ends when the current $i_L$ reaches the zero value, such an event being detected by the ZCD circuit 9. Furthermore, during any first phase, the charge Q is transferred to the load 3 and the output capacitor $C_o$; in particular, the current $i_{out}$ is equal to the current $i_L$.

During any second phase, the current $i_L$ further decreases (i.e., it becomes negative) with a slope equal to $-V_{in}/(2L)$. At the end of the second phase, the current $i_L$ assumes a maximum negative value.

During any third phase, the current $i_L$ rises, starting from the maximum negative value, with a slope equal to $[V_{out}-(V_{in}/2)]/L$, until it reaches the zero value. The third phase precisely ends when the current $i_L$ reaches the zero value, such an event being detected by the ZCD circuit 9. Furthermore, during any third phase, the charge Q is transferred to the load 3 and the output capacitor $C_o$; in particular, the current $i_{out}$ is equal to $-i_L$. The end of the third phase coincides with the start of the following fourth phase.

In greater detail, by assuming $\beta=2\pi*T_S/T_{SW}$, any second or fourth phase corresponds to a phase angle $\beta$, whereas any first or third phase corresponds to a phase angle equal to $\pi-\beta$. Furthermore, the charge transferred to the load 3 and the output capacitor $C_o$ during the first phase and the third phase, divided by $T_{SW}$, is equal to the current $I_{LOAD}$, i.e. to the average current absorbed by the load 3 during the switching period $T_{SW}$.

In practice, if $V_{out} < V_{in}/2$, the control module sets the duration $T_S'$, whereas the duration $T_S$ depends on the signal sZCD; on the contrary, if $V_{out} > V_{in}/2$, the control module sets the duration $T_S$, whereas the duration $T_S'$ depends on the signal sZCD. In both cases, the durations $T_S$ and $T_S'$ are adjusted so as to keep the average output voltage $V_{out}$ at a desired value.

This having been said, it is possible to demonstrate that, to a first approximation, the following equation applies:

$$I_{out} = V_{in} * \tan[(\omega_r * T_{SW})/4]/(Z_r * T_{SW}) * T_S \qquad (1)$$

wherein $Z_r=(L_r/C_r)^{1/2}$ and $\omega_r=1/(L_r*C_r)^{1/2}$.

Furthermore, based on geometrical considerations, it is possible to demonstrate that:

$$\alpha = \pi * [(V_{in}/2) - V_{out}]/(V_{in} - V_{out}) \qquad (2)$$

$$\beta = \pi * [V_{out} - (V_{in}/2)]/V_{out} \qquad (3)$$

It is thus apparent that the angles $\alpha$ and $\beta$ only depend on the input voltage $V_{in}$ and the average output voltage $V_{out}$. Therefore, also the ratio $T_S/T_{SW}$ is constant. Furthermore, assuming $f_{SW} \gg f_{RES}$, it is possible to demonstrate that, to a first approximation:

$$I_{out} = (V_{in} * \pi * f_{RES})/(2 * Z_r) * T_S = V_{in}/(4*L) * T_S \qquad (4)$$

Since at steady state the current $I_{out}$ is equal to the current $I_{LOAD}$, and considering that $T_S/T_{SW} = T_S * f_{SW}$=constant, it follows that the switching frequency $f_{SW}$ is directly proportional to the inverse of the current $I_{LOAD}$. Put in other words, when the current $I_{LOAD}$ decreases, the switching frequency $f_{SW}$ has to increase in order to regulate the average output voltage $V_{out}$. That leads to a loss of efficiency, when the current $I_{LOAD}$ is low, because of the losses caused by the switching.

In order to overcome the above loss of efficiency, it is known to control the converter 1 so as force the converter 1 to work at a constant frequency $f_{SW}$, i.e. so as to ignore the signal sZCD. However, in this case, when the current $I_{LOAD}$ approaches to zero, the second and the fourth phase are skipped, therefore during any first or third phase, charge is transferred to the load 3 and the output capacitor $C_o$ and then taken back; as a consequence, the efficiency is low.

As an alternative, it is possible to control the converter 1 so as force the converter 1 to work at a constant frequency $f_{SW}$ much lower than $f_{RES}$. Also, in this case, the second and the fourth phase are skipped, and a fixed amount of charge is delivered to the load 3 for each pulse, the repetition time of the pulses being adjusted as a function of the current $I_{LOAD}$. However, in this case the converter 1 operates in the capacitive region (i.e., the inductor $L_r$ is substantially equivalent to a short circuit), so it is possible to provide power (i.e., to transfer a positive charge) to the load 3 only if $V_{out} < V_{in}/2$.

Various embodiments thus provide a module for controlling a resonant switched-capacitor converter that will enable the drawbacks of the prior art to be overcome at least in part.

SUMMARY

According to various embodiments, a control module and a method for controlling a resonant switched-capacitor converter are provided, as defined in the annexed claims.

BRIEF DESCRIPTION OF THE DRAWINGS

For a better understanding of the present invention, preferred embodiments thereof will now be described purely by way of non-limiting example, with reference to the attached drawings, wherein.

DETAILED DESCRIPTION OF ILLUSTRATIVE EMBODIMENTS

Figure 4:
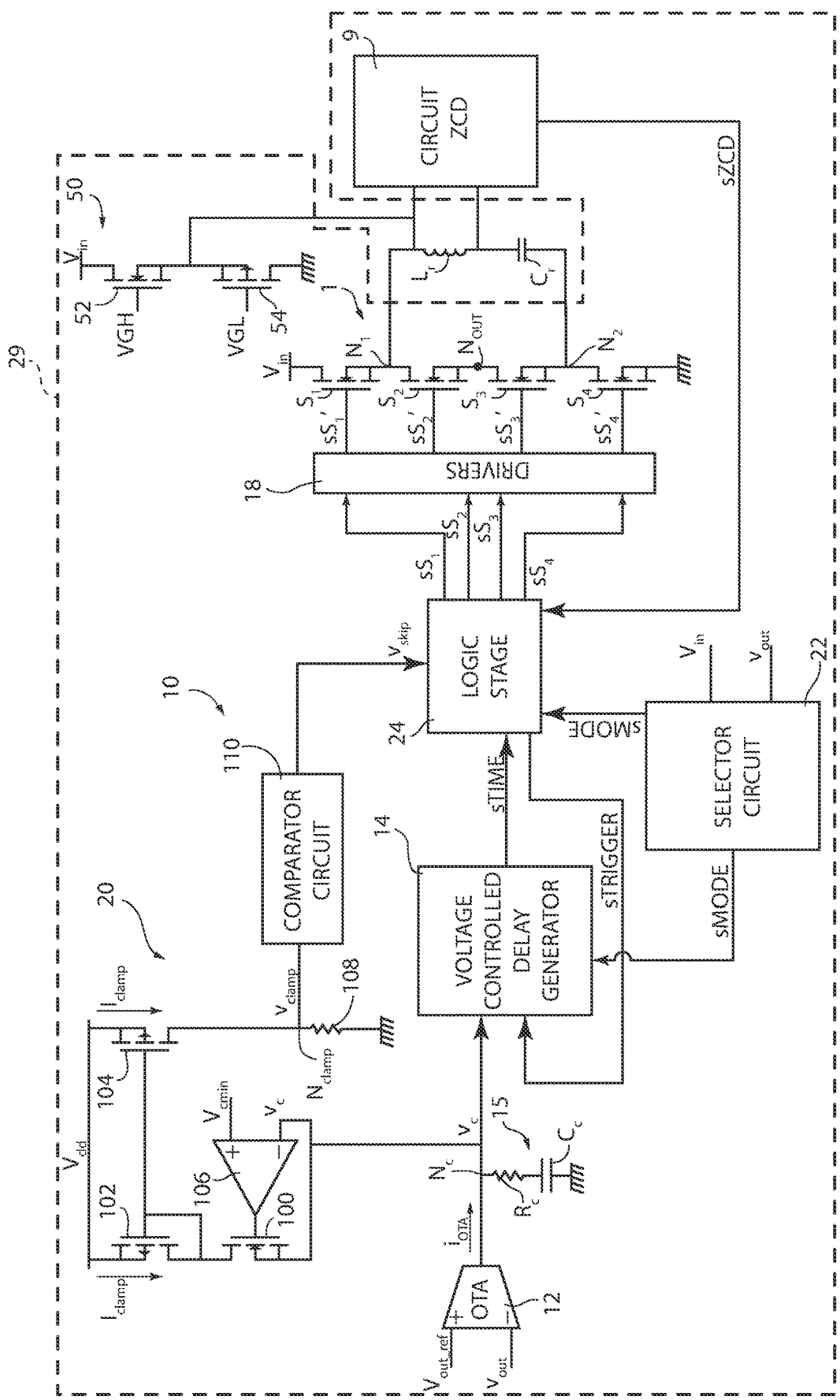
FIGS. 4, 9, 10, 12 show circuit schemes of control modules.

FIG. 4 shows a control module 10, which controls the converter 1 shown in FIGS. 1A-1D. For the sake of simplicity, FIG. 4 does not show the load 3 and the output capacitor $C_o$.

In detail, the control module 10 comprises the ZCD circuit 9, an operational transconductance amplifier 12, a voltage controlled delay generator 14, a driver stage 18 and a compensation network 15 including a resistor $R_c$ and a capacitor $C_c$. In addition, the control module 10 comprises a clamping circuit 20, a selector circuit 22 and a logic stage 24. Though not shown, the control module 10 may further include a reference generator configured to generate an output reference voltage $V_{out\_ref}$. The operational transconductance amplifier 12 is of the single-ended type.

Though not shown, the negative input terminal of the operational transconductance amplifier 12 is connected to the output node $N_{OUT}$, in order to receive the output voltage $v_{out}$. The positive input terminal of the operational transconductance amplifier 12 is set to the output reference voltage $V_{out\_ref}$. Therefore, an error voltage $v_{err} = V_{out\_ref} - V_{out}$ is present on the input of the operational transconductance amplifier 12.

The output terminal of the operational transconductance amplifier 12 forms a control node $N_c$. The compensation network 15 is connected between the control node $N_c$ and ground. In particular, a first terminal of the resistor $R_c$ is connected to the control node $N_c$; a second terminal of the resistor $R_c$ is connected to a first terminal of the capacitor $C_c$, whose second terminal is connected to ground. Hereinafter, reference is made to the control voltage $v_c$ to designate the voltage on the control node $N_c$.

As an example, the capacitance of the capacitor $C_c$ may be comprised in the range 1 pF-1 nF; the resistance of the resistor $R_c$ may be comprised in the range 1 kΩ-1 MΩ.

Assuming a very high value of the output resistance of the operational transconductance amplifier 12, this latter injects into (or drains from) the control node $N_c$ a current $i_{OTA}$ which is directly proportional to the error voltage $v_{err}$; as an example, the current $i_{OTA}$ is respectively injected or drained, if the error voltage $v_{err}$ is respectively positive or negative. In particular, $i_{OTA} = gm_{OTA} * v_{err}$, wherein $gm_{OTA}$ is the gain of the operational transconductance amplifier 12.

From a practical point of view, and to a first approximation, the operational transconductance amplifier 12 and the compensation network 15 form a proportional integrative controller, because the dependence of the control voltage $v_c$ on the current $i_{OTA}$, and thus on the error voltage $v_{err}$, is approximately of the proportional integrative type. From a physical standpoint, this dependence is explained here below with reference, as an example, to the case $i_{OTA} > 0$.

In detail, at low frequencies, i.e. in case of slowly varying components of the error voltage $v_{err}$, the capacitor $C_c$ dominates the behaviour of the compensation network 15; therefore, the current $i_{OTA}$ is integrated by the capacitor $C_c$, thereby causing the control voltage $v_c$ to rise. At high frequencies, i.e. in case of quickly varying components of the error voltage $v_{err}$, the capacitor $C_c$ acts as a short circuit, so the current $i_{OTA}$ causes a voltage drop on the compensation network 15, which depends on the resistance of the resistor $R_c$.

The selector circuit 22 receives the input voltage $V_{in}$ and the output voltage $v_{out}$. Furthermore, the selector circuit 22 compares the average output voltage $V_{out}$ with $V_{in}/2$ and generates a signal sMODE, which is equal to '1' or '0', respectively when $V_{out} < V_{in}/2$ or $V_{out} > V_{in}/2$.

Figure 5:
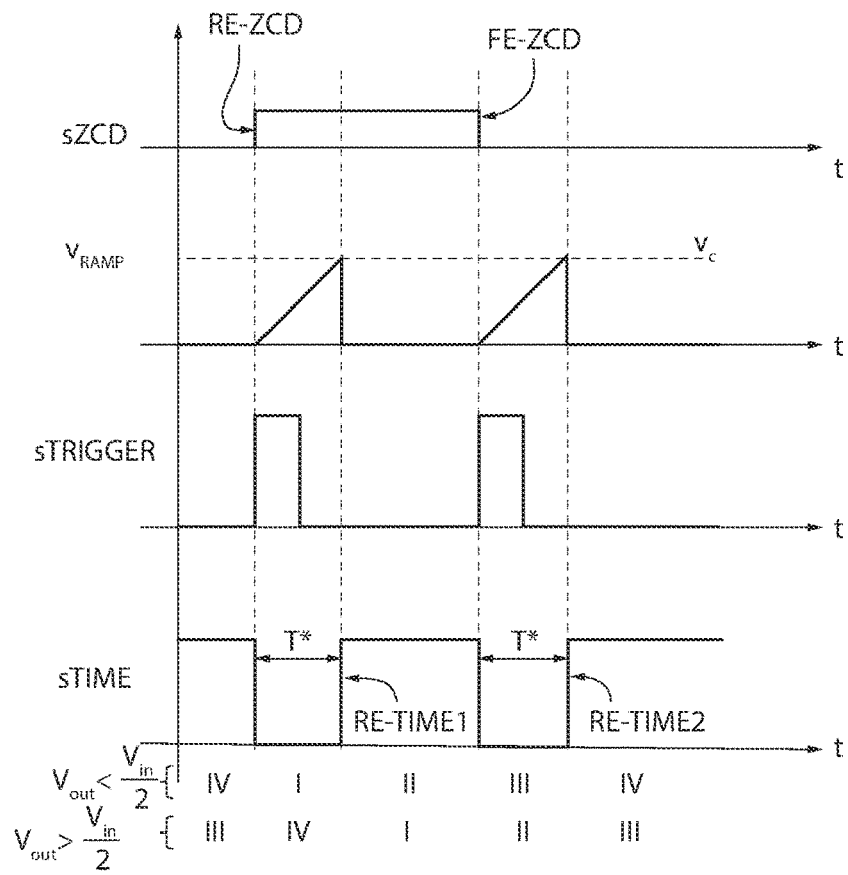
FIGS. 5, 7 and 11 show time plots of signals generated in the control module.

The voltage controlled delay generator 14 has inputs respectively connected to the control node $N_c$, to receive the control voltage $v_c$, and to the logic stage 24, to receive a signal sTRIGGER generated by this latter. As shown in FIG. 5, the signal sTRIGGER may be a periodic pulsed signal, with duty cycle lower than 50%; in particular, the logic stage 24 generates a rising edge of the signal sTRIGGER whenever a rising or falling edge of the signal sZCD occur.

The voltage controlled delay generator 14 generates a signal sTIME. As an example, the voltage controlled delay generator 14 may be configured so as to generate a falling edge of the signal sTIME at each rising edge of the signal sTRIGGER, as shown in FIG. 5.

Furthermore, the voltage controlled delay generator 14 may be configured so as to charge, after each rising edge of the signal sTRIGGER, a respective capacitor (not shown) with a fixed current, and to generate a rising edge of the signal sTIME when the voltage on the capacitor (designated by $v_{RAMP}$ in FIG. 5) reaches a threshold value linearly depending on (e.g., equal to) the control voltage $v_c$, thereby causing each rising edge of the signal sTIME to be delayed by a delay T* from the preceding falling edge. To a first approximation, the delay T* linearly depends on the control voltage $v_c$.

In practice, the signal sTIME represents the delay T*, which assumes a corresponding value for each switching period $T_{SW}$. Furthermore, the fixed current that charges the abovementioned capacitor assumes a first or a second predetermined value, respectively when the signal sMODE is equal to '1' or '0', the first value being as an example lower than the second value. In this way, given any value of the control voltage $v_c$, the corresponding value of the delay T* depends on whether $V_{out} < V_{in}/2$ or $V_{out} > V_{in}/2$; in particular, given any value of the control voltage $v_c$, the value of the corresponding delay T* is higher in case $V_{out} < V_{in}/2$. In this way, it is possible to use the same voltage controlled delay generator 14 to generate the correct values of the delay T* in both the scenarios $V_{out} < V_{in}/2$ and $V_{out} > V_{in}/2$, instead of using two different voltage controlled delay generators. Furthermore, though not described, embodiments are possible in which the behaviour of voltage controlled delay generator 14 does not depend on the signal sMODE, i.e. on the scenario, in which case the circuit complexity may increase.

As an alternative, the voltage controlled generator 14 may be formed by a chain of inverters, whose supply voltage is equal to the control voltage $v_c$, so that the delay introduced by the inverter chain depends on the control voltage $v_c$. In this case, the delay decreases as the control voltage $v_c$ increases, so the closed loop that controls the output voltage $v_{out}$ may be modified so as to maintain a global negative feedback. In any case, the technical implementation of the voltage controlled delay generator 14 is irrelevant for the implementation of various embodiments.

In greater detail, when the control module 10 operates in a normal mode, the delay T* represented by the signal sTIME is used by the logic stage 24 to set either the duration $T_S'$ (if $V_{out} < V_{in}/2$) or the duration $T_S$ (if $V_{out} > V_{in}/2$).

As an example, assuming that FIG. 5 refers to the case $V_{out}<V_{in}/2$ and assuming as a reference a time instant of any fourth phase, the logic stage 24 ends this fourth phase upon receiving a rising edge (designated by RE-ZCD in FIG. 5) of the signal sZCD and then implements a first phase (i.e., the digital signals $sS_1$, $sS_2$, $sS_3$, $sS_4$ assume corresponding values such that a first phase is carried out) for a time interval equal to the delay T* represented by the signal sTIME; put in other words, the first phase lasts until the reception of the first rising edge (designated by RE-TIME1 in FIG. 5) of the signal sTIME following the rising edge RE-ZCD of the signal sZCD. Then, the logic stage 24 implements a second phase, until it receives a falling edge of the signal sZCD, designated by FE-ZCD in FIG. 5. Then, the logic circuit 24 implements a third phase for a time interval equal to the delay T* represented by the signal sTIME (to a first approximation, this value hasn't changed with respect to the preceding first phase), i.e. it implements a third phase lasting till the reception of the first rising edge (designated by RE-TIME2 in FIG. 5) of the signal sTIME following the falling edge FE-ZCD of the signal sZCD. Finally, the logic stage 24 implements a new fourth phase, until the reception of the following rising edge of the signal sZCD (not shown in FIG. 5).

The same considerations apply in case $V_{out}>V_{in}/2$. In particular, assuming as a reference a time instant of any third phase, the logic stage 24 ends this third phase upon receiving the rising edge RE-ZCD of the signal sZCD and then implements a fourth phase for a time interval equal to the delay T* represented by the signal sTIME; put in other words, the fourth phase lasts till the reception of the rising edge RE-TIME1 of the signal sTIME. Then, the logic stage 24 implements a first phase, until it receives the falling edge FE-ZCD of the signal sZCD. Then, the logic circuit 24 implements a second phase for a time interval equal to the delay T* represented by the signal sTIME, i.e. it implements a second phase lasting till the reception of the rising edge RE-TIME2 of the signal sTIME. Finally, the logic stage 24 implements a new third phase, till the reception of the following rising edge of the signal sZCD (not shown in FIG. 5).

The clamping circuit 20 comprises a first, a second and a third clamping transistor 100, 102, 104, an operational amplifier 106, a clamping resistor 108 and a comparator circuit 110.

The first clamping transistor 100 is a NMOS transistor, with source terminal connected to the control node $N_c$. The second and the third clamping transistor 102, 104 are PMOS transistors and form a current mirror. In particular, the gate and drain terminals of the second clamping transistor 102 are connected to the drain terminal of the first clamping transistor 100; in addition, the gate terminal of the second clamping transistor 102 is connected to the gate terminal of the third clamping transistor 104. The source terminal of the second clamping transistor 102 is set to a supply voltage $V_{dd}$, which may equal, as an example, to the input voltage $V_{in}$.

The source terminal of the third clamping transistor 104 is set to the supply voltage $V_{dd}$. The drain terminal of the third clamping transistor 104 is connected to a first terminal of the clamping resistor 108, whose second terminal is connected to ground. The first terminal of the clamping resistor 108 forms a clamping node $N_{clamp}$; hereinafter reference will be made to the voltage $v_{clamp}$ to designate the voltage on the clamping node $N_{clamp}$.

The negative input terminal of the operational amplifier 106 is connected to the control node $N_c$. The positive input terminal of the operational amplifier 106 is set to a DC voltage $V_{cmin}$. The output terminal of the operational amplifier 106 is connected to the gate terminal of the first clamping transistor 100.

The input of the comparator circuit 110 is connected to the clamping node $N_{clamp}$, whereas the output is connected to the logic stage 24.

In detail, the comparator circuit 110 is a hysteretic comparator, which is configured to compare the voltage $v_{clamp}$ with a first and a second threshold $V_{thres\_max}$, $V_{thres\_min}$, with $V_{thres\_max}>V_{thres\_min}$. Furthermore, the comparator circuit 110 generates on its output a signal $v_{skip}$.

As an example, the comparator circuit 110 may generate a rising edge (i.e., a transition from '0' to '1') of the signal $v_{skip}$ whenever the voltage $v_{clamp}$ overcomes the first threshold $V_{thres\_max}$; in addition, the comparator circuit 11o may generate a falling edge (i.e., a transition from '1' to '0') of the signal $v_{skip}$ whenever the voltage $v_{clamp}$ drops below the second threshold $V_{thres\_min}$.

In the following, reference will be made to the voltage vc_dc to designate the voltage applied at steady-state by the operational transconductance amplifier 12 on the control node $N_c$ when $v_{out}=V_{out\_ref}$. Furthermore, it will be assumed that, in order to have, at steady-state, $I_{out}=I_{LOAD}$, the control voltage $v_c$ has to be greater than the voltage vc_dc; therefore, at steady-state the average output voltage $V_{out}$ is lower than the output reference voltage $V_{out\_ref}$ (though, to a first approximation it may be assumed, for the sake of simplicity, $V_{out}=V_{out\_ref}$, assuming a high loop gain and neglecting the ripple on the output voltage $v_{out}$). However, it has to be noted that, from the standpoint of the functioning of the control module, nothing would change if, at steady-state, the average output voltage $V_{out}$ was greater than the output reference voltage $V_{out\_ref}$; also, in this case, it would be possible to assume $V_{out}=V_{out\_ref}$.

Furthermore, by referring to the current $I_{LOAD\_MIN}$ to indicate the value of the current $I_{LOAD}$ such that the control voltage $v_c$ is equal to the voltage $V_{cmin}$, if $I_{LOAD}>I_{LOAD\_MIN}$, the control voltage $v_c$ is higher than the voltage $V_{cmin}$ and such that the corresponding value of the delay T* causes the current $I_{out}$ to be equal to the current $I_{LOAD}$. According to whether the voltage $V_{cmin}$ is lower or greater than the voltage vc_dc, at steady-state the average voltage $V_{out}$ is respectively greater or lower than the output reference voltage $V_{out\_ref}$; however, as explained above, in both cases it may be assumed $V_{out}=V_{out\_ref}$ at steady-state.

Figure 1A:
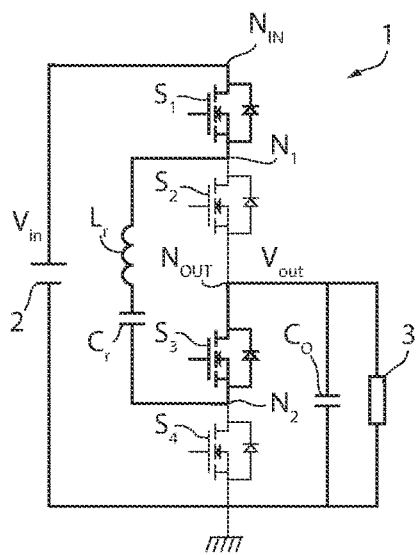
FIGS. 1A-1D show circuit schemes of a portion of a converter, in different operating phases.
Figure 1B:
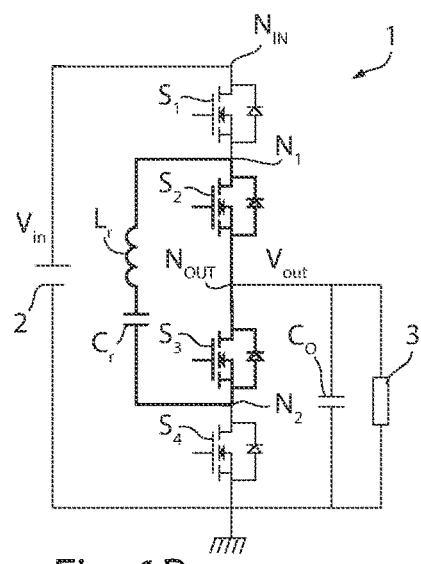
Figure 1C:
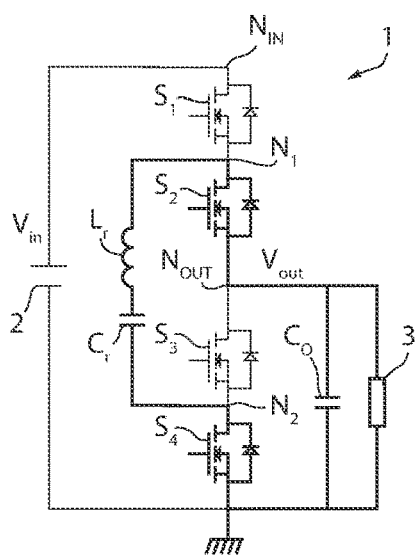
Figure 1D:
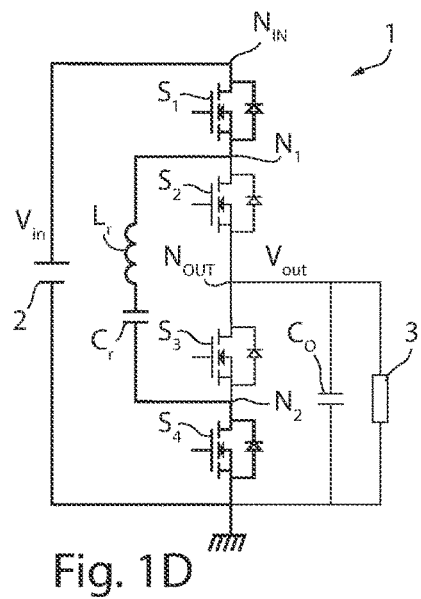
Figure 2:
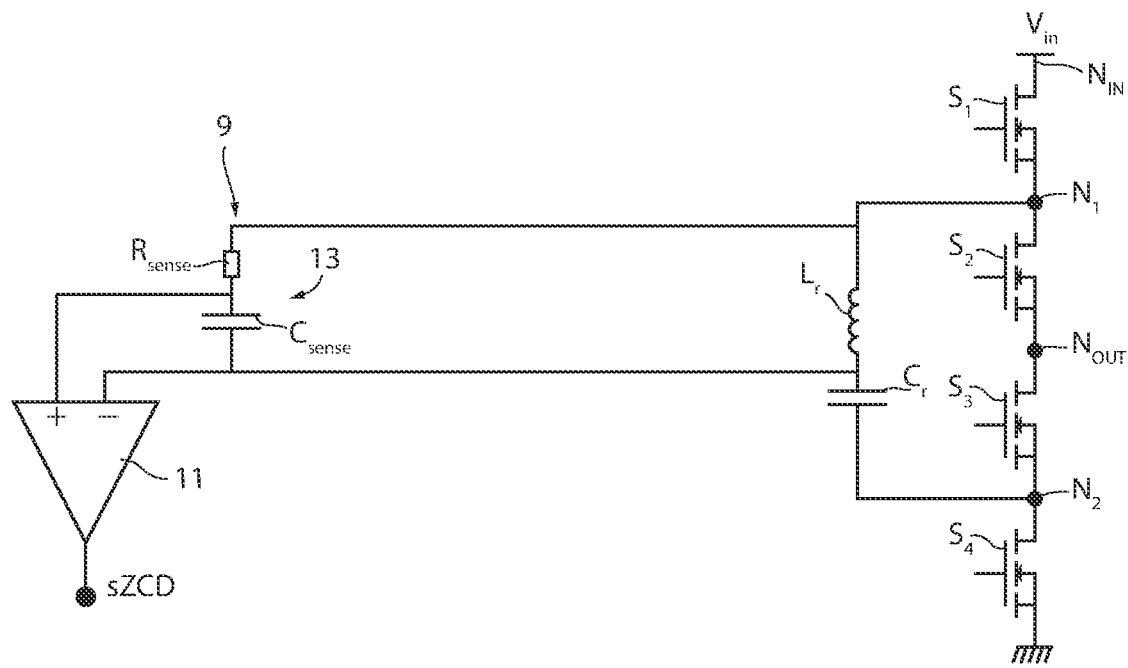
FIG. 2 shows a circuit scheme of a portion of a converter.
Figure 3A:
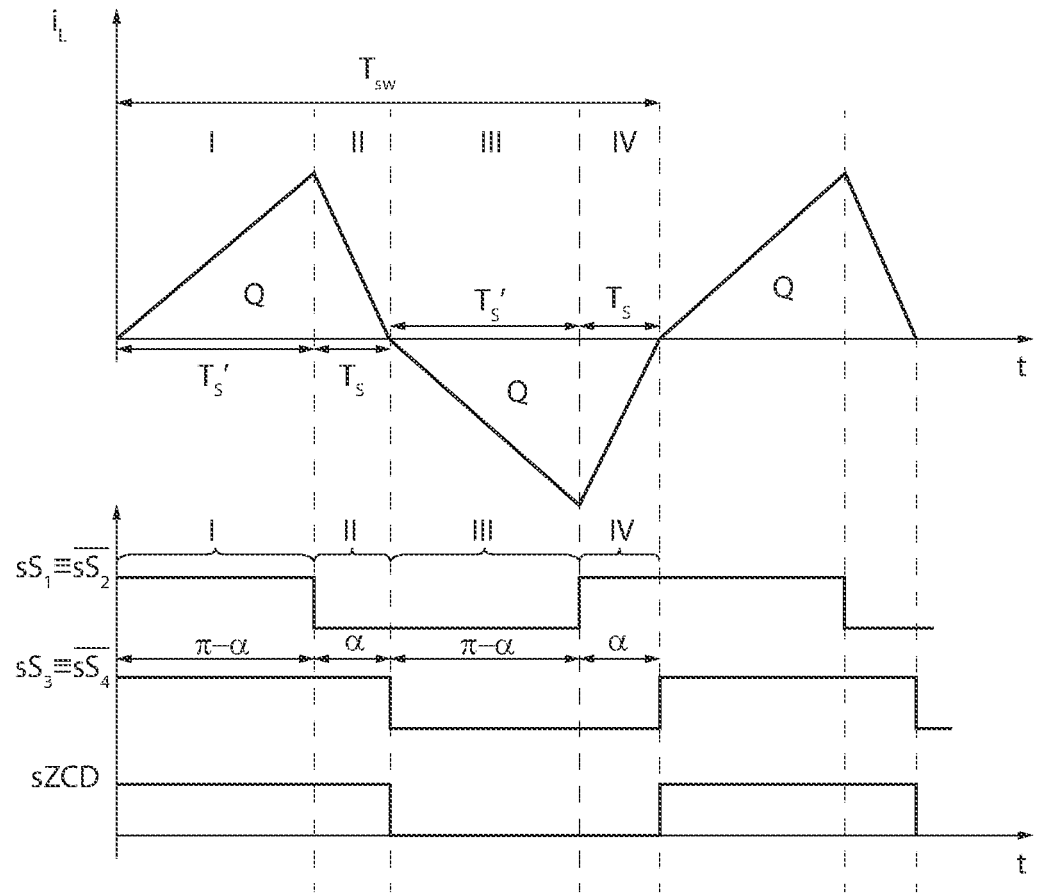
FIGS. 3A and 3B show time plots of a current and of signals.
Figure 3B:
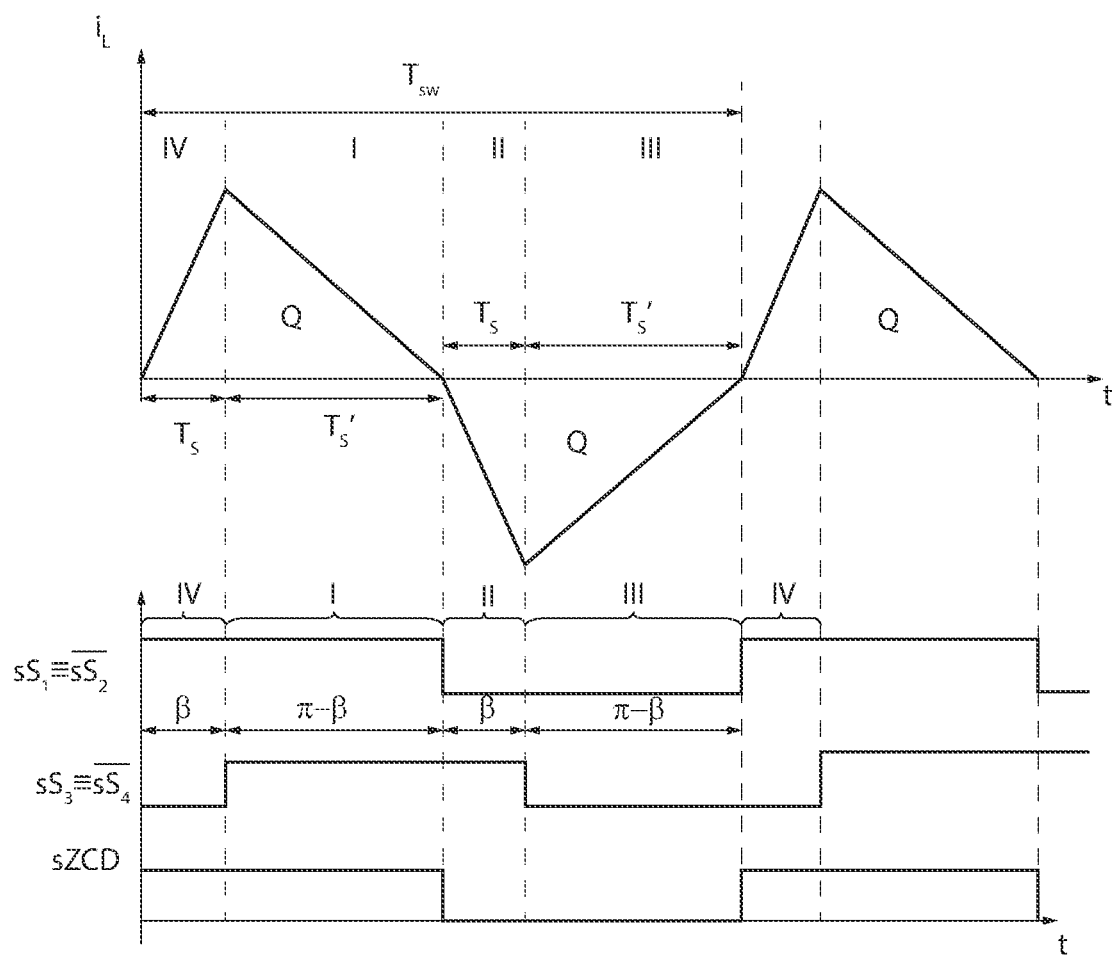

Since the control voltage $v_c$ is higher than the voltage $V_{cmin}$, the first clamping transistor 100 is off; the clamping circuit 20 is thus decoupled from the control node $N_c$. Furthermore, no current flows in the current mirror formed by the second and the third clamping transistor 102, 104, thus the voltage $v_{clamp}$ is equal to zero. In addition, the signal $v_{skip}$ is equal to '0', and the logic stage 24 generates the signals $sS_1$, $sS_2$, $sS_3$ and $sS_4$ based on the signal sTIME, the signal sMODE and the signal sZCD, as shown in FIG. 3A or 3B and 5. As an example, if sMODE='1' (i.e., $V_{out}<V_{in}/2$), the logic stage 24 generates the signals $sS_1$, $sS_2$, $sS_3$ and $sS_4$ as shown in FIG. 3A, so that the duration $T_S'$ is equal to the delay T* represented by the signal sTIME. If sMODE='0' (i.e., $V_{out}>V_{in}/2$), the logic stage 24 generates the signals $sS_1$, $sS_2$, $sS_3$ and $sS_4$ as shown in FIG. 3B, so that the duration $T_S$ is equal to the delay T* represented by the signal sTIME.

The driver stage 18 is connected to the logic stage 24 and to the first, the second, the third and the fourth transistor $S_1$, $S_2$, $S_3$, $S_4$.

In detail, the driver stage 18 receives the signals $sS_1$, $sS_2$, $sS_3$ and $sS_4$ and generates a corresponding first gate signal $sS_1'$, a corresponding second gate signal $sS_2'$, a corresponding third gate signal $sS_3'$ and a corresponding fourth gate signal $sS_4'$, which are respectively applied to the gate terminals of the first, the second, the third and the fourth transistor $S_1$, $S_2$, $S_3$, $S_4$.

In greater detail, by adopting an integer index 'i' (with i=1, 2, 3, 4), when the signal $sS_i$ is respectively equal to '1' or '0', the corresponding gate signal $sS_i'$ is respectively equal to a voltage $V_{on\_i}$ or a voltage $V_{off\_i}$, the voltages $V_{on\_i}$ and $V_{off\_i}$ being such that the i-th transistor $S_i$ is respectively on or off.

Figure 6:
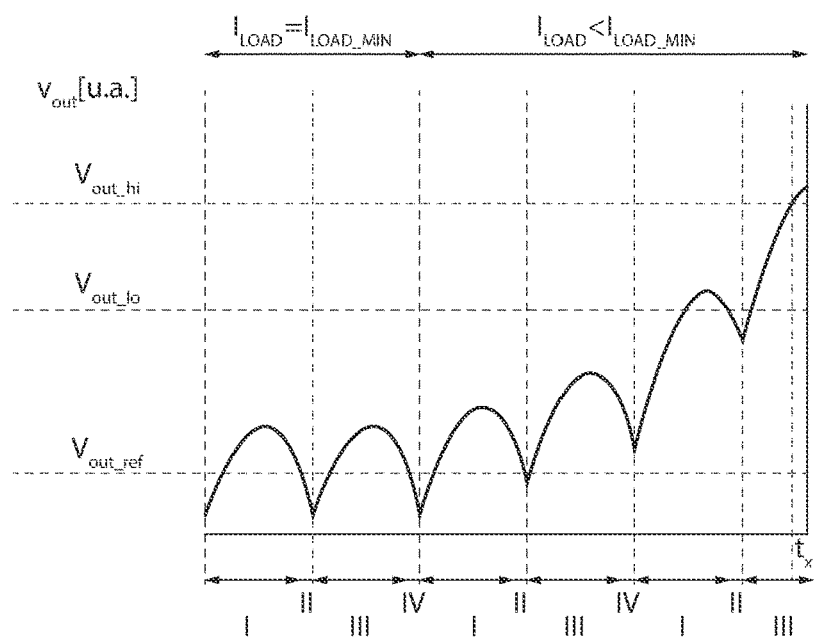
FIG. 6 shows a time plot of a voltage generated by the converter.

This having been said, in case the current $I_{LOAD}$ starts to decrease with respect to the abovementioned steady-state, the average output voltage $V_{out}$ tends to rise (for the sake of simplicity, to a first approximation it may be assumed that such a rise is negligible, given the high gain of the control loop), so as to reduce the control voltage $v_c$ and thus reduce the duration $T_S'$ (if $V_{out}<V_{in}/2$) or the duration $T_S$ (if $V_{out}>V_{in}/2$), in order to adapt, in both cases, the current $I_{out}$ to the current $I_{LOAD}$. In practice, as shown in FIG. 6 (left part), if the current $I_{LOAD}$ is equal to a value $I_{LOAD\_MIN}$, the average output voltage $V_{out}$ is still approximately equal to the output reference voltage $V_{out\_ref}$.

If the current $I_{LOAD}$ drops below the value $I_{LOAD\_MIN}$, the control voltage $v_c$ tends to drop below the voltage $V_{cmin}$, thereby causing the operational amplifier 106 to switch, thereby turning on the first clamping transistor 100 and coupling the clamping circuit 20 to the control node $N_c$.

In practice, the voltage $V_{cmin}$ defines the minimum values admissible for the durations $T_S'$ (if $V_{out}<V_{in}/2$) or $T_S$ (if $V_{out}>V_{in}/2$), hereinafter referred to as $T_{Smin}'$ or $T_{Smin}$, which are respectively equal to the two values of the delay T* represented by the signal sTIME when the control voltage $v_c$ is equal to the voltage $V_{cmin}$, in the cases $V_{out}<V_{in}/2$ and $V_{out}>V_{in}/2$.

Since the clamping circuit 20 is now coupled to the control node $N_c$, the drop of the control voltage $v_c$ is temporarily stopped, i.e. the control voltage $v_c$ is temporarily stuck to the voltage $V_{cmin}$. That implies that the current $I_{out}$ becomes higher than the current $I_{LOAD}$. Therefore, the average output voltage $V_{out}$ rises above the output reference voltage $V_{out\_ref}$, as shown FIG. 6 (right part), thereby causing an inversion of the sign of the error voltage $v_{err}$. Therefore, the operational transconductance amplifier 12 attempts to decrease the control voltage $v_c$, by draining current from the control node $N_c$, this current, hereinafter referred to as the current $i_{clamp}$, being provided by the clamping circuit 20, so as to allow the control voltage $v_c$ to remain stuck at the voltage $V_{cmin}$. In practice, $i_{clamp}=-i_{OTA}=-gm_{OTA}*v_{err}$.

Figure 7:
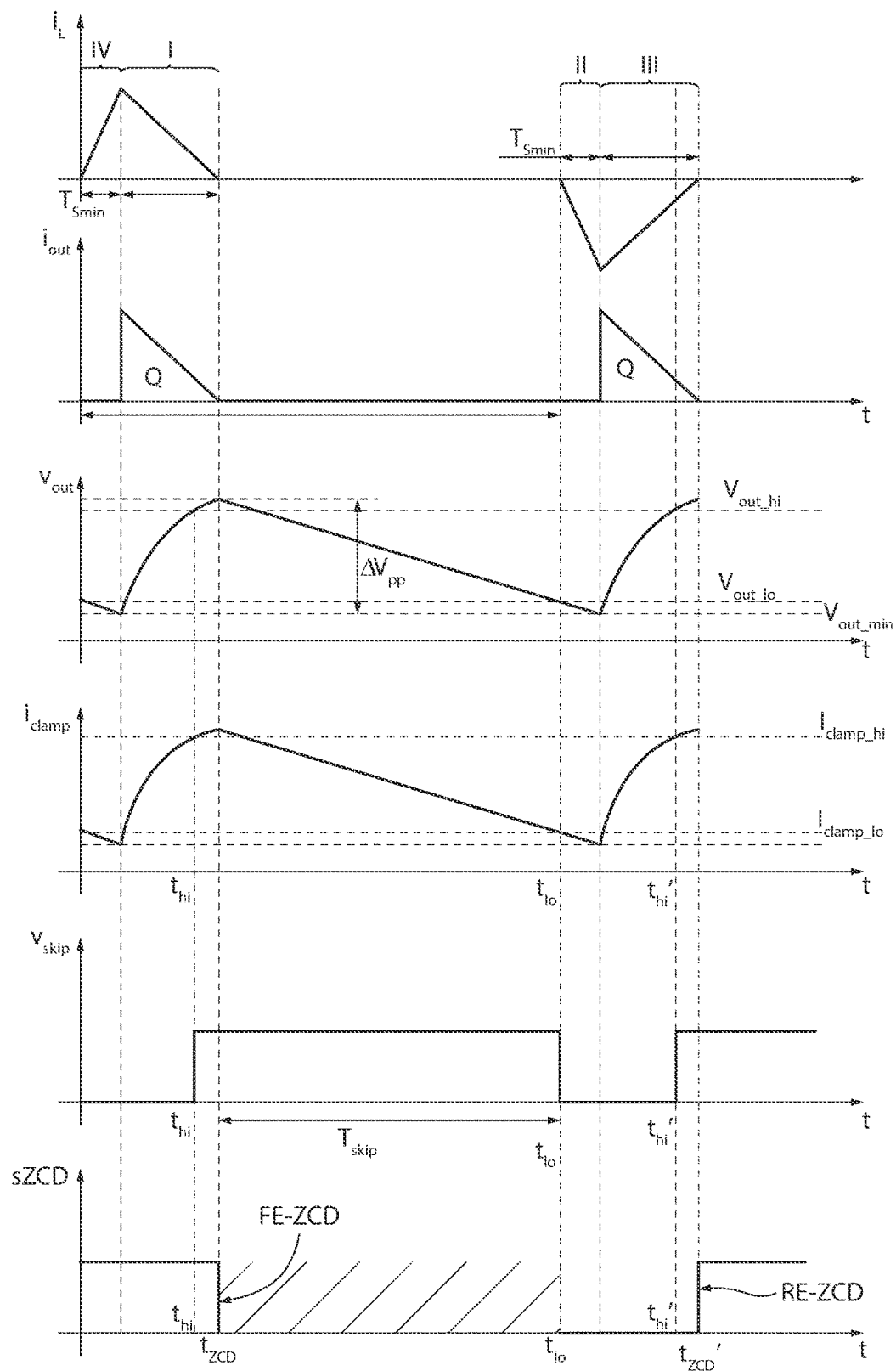

In greater detail, the current $i_{clamp}$ flows through the first and the second clamping transistor 100, 102 and it is mirrored by the current mirror, so that the same current $i_{clamp}$ flows through the third clamping transistor 104; therefore, the voltage $v_{clamp}$ rises over time, until it reaches the first threshold $V_{thres\_max}$, thereby causing the comparator circuit 110 to generate a rising edge of the signal $v_{skip}$, as shown in FIG. 7, which refers as an example to the case $V_{out}>V_{in}/2$. The time instant in which the rising edge of the signal $v_{skip}$ occurs is designated by $t_{hi}$.

In practice, the voltage $v_{clamp}$ (not shown in FIG. 7) reaches the first threshold $V_{thres\_max}$ when the current $i_{clamp}$ reaches a corresponding threshold $I_{clamp\_hi}$. Furthermore, the first threshold $V_{thres\_max}$ relating to the voltage $v_{clamp}$ corresponds to a first output threshold $V_{out\_hi}$ relating to the output voltage $v_{out}$, i.e., when the voltage $v_{clamp}$ reaches the first threshold $V_{thres\_max}$, the output voltage $v_{out}$ reaches the first output threshold $V_{out\_hi}$. To this regard, FIGS. 6 and 7 refer to two different examples. In addition, in FIG. 6, the time instant in which the output voltage $v_{out}$ reaches the first output threshold $V_{out}$ hi is designated by $t_x$; furthermore, FIG. 6 shows the trend of the output voltage $v_{out}$ when passing from $I_{LOAD}=I_{LOAD\_MIN}$ to $I_{LOAD}<I_{LOAD\_MIN}$, up to the time instant $t_x$. FIG. 7 refers to the case $I_{LOAD}<I_{LOAD\_MIN}$; furthermore, in FIG. 7 the time instant in which the output voltage $v_{out}$ reaches the first output threshold $V_{out\_hi}$ is designated by $t_{hi}$. Hereinafter, reference will be made to the example of FIG. 7 to explain the events occurring after the time instant in which the output voltage $v_{out}$ reaches the first output threshold $V_{out\_hi}$.

In detail, it is possible to demonstrate that:

$$V_{out\_hi}=V_{out\_ref}+I_{thres\_max}/gm_{OTA} \qquad (5)$$

After the signal $v_{skip}$ goes to '1', the logic stage 24 enters into a pulse skipping mode, as explained here below, with reference to the example shown in FIG. 7, in which the time instant $t_{hi}$ falls into a first phase, hereinafter referred to as the initial phase.

Since the signal $v_{skip}$ has gone to '1', at the end of the initial phase, which, as explained above, is marked by the falling edge FE-ZCD of the signal sZCD (which occurs at a time instant $t_{ZCD}$), the logic stage 24 stops the execution of the phase sequence, which will be resumed later on. Therefore, after the time instant $t_{hi}$, the output voltage $v_{out}$ rises only until (approximately) the end of the abovementioned initial phase; during the time interval comprised between the time instant $t_{hi}$ and the end of the abovementioned initial phase, the current $i_{clamp}$ may assume values higher than the first threshold $I_{clamp\_hi}$.

In order to stop the execution of the phase sequence, the logic stage 24 may, as an example, set all the signals $sS_1$, $sS_2$, $sS_3$ equal to '0', in order to temporarily turn off the first, the second and the third transistor $S_1$, $S_2$, $S_3$. Put in other words, the output node $N_{OUT}$ is set to a high impedance condition.

Since the execution of the phases is suspended, the output voltage $v_{out}$ decreases, starting approximately from the end of the abovementioned initial phase and with a slope depending on the ratio $I_{LOAD}/C_o$, so also the current $i_{clamp}$ and the voltage $v_{clamp}$ decrease. At a time instant $t_{lo}$, the current $i_{clamp}$ reaches a corresponding second threshold $I_{clamp\_lo}$, thus the voltage $v_{clamp}$ reaches the second threshold $V_{thres\_min}$ and the output voltage $v_{out}$ reaches a second output threshold $V_{out\_lo}$, which is lower than the first output threshold $V_{out\_hi}$ and greater than the output reference voltage $V_{out}$ ref.

In particular, it is possible to demonstrate that:

$$V_{out\_lo}-V_{out\_ref}+I_{thres\_min}/gm_{OTA} \qquad (6)$$

At the time instant $t_{lo}$, since the voltage $v_{clamp}$ has reached the second threshold $V_{thres\_min}$, the signal $v_{skip}$ goes to '0', which in turn causes the logic stage 24 to resume the execution of the phase sequence; put in other words, the control module 10 temporarily resumes to operate in normal mode.

As an example, referring to FIG. 7, after the time instant $t_{lo}$, the logic stage 24 implements the second phase (i.e., it resumes to generate the signals $sS_1$, $sS_2$, $sS_3$, $sS_4$ in a manner such that a second phase is implemented) and then a third phase. Furthermore, the time interval extending between the time instant $t_{ZCD}$ and the time instant $t_{lo}$ represents a pulse-skipping period $T_{skip}$.

During the second phase that follows the time instant $t_{lo}$ the output voltage $v_{out}$ and the current $i_{clamp}$ continue to decrease, i.e. they assume values respectively lower than the second output threshold $V_{out\_lo}$ and the second threshold $I_{clamp\_lo}$, because no charge is delivered to the load 3, nor to the output capacitor $C_o$. In particular, at the end of the second phase, the output voltage $v_{out}$ is equal to a minimum value $V_{out\_min}$. In case $V_{out\_min} > V_{out\_ref}$, the current $i_{clamp}$ remains different from zero, in which case the control voltage $v_c$ stays stuck to the voltage $v_{cmin}$. On the contrary, if $V_{out\_min} \le \text{Vout\_ref}$, the current $i_{clamp}$ reaches the zero value and the control voltage $v_c$ is no more stuck to the voltage $v_{cmin}$, so it may temporarily rise, until when the output voltage $v_{out}$ reaches the output reference voltage $V_{out\_ref}$, thereby causing a new clamping of the control voltage $v_c$ to the voltage $v_{cmin}$.

During the following third phase, and under the assumption that the current $I_{LOAD}$ has not changed (i.e., the current $I_{LOAD}$ is still lower than $I_{LOAD\_MIN}$), the output voltage $v_{out}$ and the current $i_{clamp}$ rise. In particular, at a time instant $t_{hi}'$, it occurs $i_{clamp} = I_{clamp\_hi}$, $v_{clamp} = V_{thres\_max}$ and the output voltage $v_{out}$ reaches again the first output threshold $V_{out\_hi}$; therefore, at the time instant $t_{hi}'$, the signal $v_{skip}$ goes to '1', the logic stage 24 enters again into the pulse skipping mode and the steps previously described are iterated: upon terminating the third phase (i.e., the new initial phase), as signalled by the rising edge RE-ZCD of the signal sZCD that follows the time instant $t_{hi}'$, which occurs at a time instant $t_{ZCD}'$, the execution of the phases is suspended, until when the voltage $v_{clamp}$ drops again below $V_{thres\_min}$ (not shown in FIG. 7).

In practice, the fourth and the first phase shown in FIG. 7 form a first semi-pulse, whereas the second and the third phase form a second semi-pulse. The first and the second semi-pulse are spaced apart in time, the time separation being inversely proportional to the current $I_{LOAD}$. The lower the value of the current $I_{LOAD}$, the higher is the time separation between the first and the second semi-pulse; the same considerations apply to possible semi-pulses (not shown in FIG. 7) that follow the second semi-pulse, so that the converter 1 is operated at a high effective switching period $T_{SWeff}$, meant as the time period during which a pair of consecutive semi-pulses occurs, thereby reducing the loss of efficiency due to switching losses. In facts, $T_{SWeff} = T_{SW} + 2*T_{skip}$, so the effective switching frequency and the related switching losses are reduced. Furthermore, the following equation applies:

$$I_{out} = 2*Q/T_{SWeff} \quad (7)$$

Still with reference to FIG. 7, had the current $I_{LOAD}$ risen to a value greater than $I_{LOAD\_MIN}$ before the execution of the abovementioned third phase, the current $i_{clamp}$ and the output voltage $v_{out}$ could not have reached, respectively, the threshold $I_{clamp\_hi}$ and the first output threshold $V_{out\_hi}$, therefore the signal $v_{skip}$ wouldn't have gone to '1'; as a consequence, the execution of the phases would have continued without any further suspension, and the average output voltage $V_{out}$ would have gradually dropped to (approximately) the output reference voltage $V_{out\_ref}$, thereby causing the control voltage $v_c$ to decouple from the voltage $V_{cmin}$.

In greater detail, though the embodiment of FIG. 4 is such that the time instants $t_{hi}$, $t_{hi}'$ in which the signal $v_{skip}$ goes to '1' fall within a first and a third phase, i.e. during phases in which charge is delivered to the output node $N_{out}$, variants are possible. In general, each of the time instants $t_{hi}$, $t_{hi}'$ may occur during any phase, as an example because of delays introduced by the clamping circuit, which may be different from the proposed one. To this regard, as an example, instead of applying a comparator to the voltage $v_{clamp}$, i.e. to a proxy quantity of the current $i_{clamp}$, the output voltage $v_{out}$ may be directly applied to a comparator with hysteresis and thresholds equals to the first and the second output thresholds $V_{out\_hi}$, $V_{out\_lo}$.

In general, assuming anytime instant $t_{transition\_hi}$ in which the signal $v_{skip}$ goes to '1', the logic stage 24 can suspend the execution of the phase sequence at the first edge (either rising or falling) of the signal sZCD that follows the time instant $t_{transition\_hi}$. In facts, the execution of the phase sequence can be suspended when the current $i_L$ is null. Furthermore, embodiments are possible in which the logic stage 24 suspends the execution of the phase sequence at the k-th (with k equal to a positive integer number greater than one) edge (either rising or falling) of the signal sZCD that follows the time instant $t_{transition\_hi}$; however, the greater is the number k, the greater is the ripple on the output voltage $v_{out}$. To this regard, by suspending the execution at the first edge (either rising or falling) following the occurrence of $v_{out} > V_{out\_hi}$, it is possible to reduce the ripple $\Delta V_{pp}$ on the output voltage $v_{out}$ to (approximately) $Q/C_o$. Furthermore, in general the signal sZCD may be disregarded by the logic stage 24 during any period $T_{skip}$.

Figure 8A:
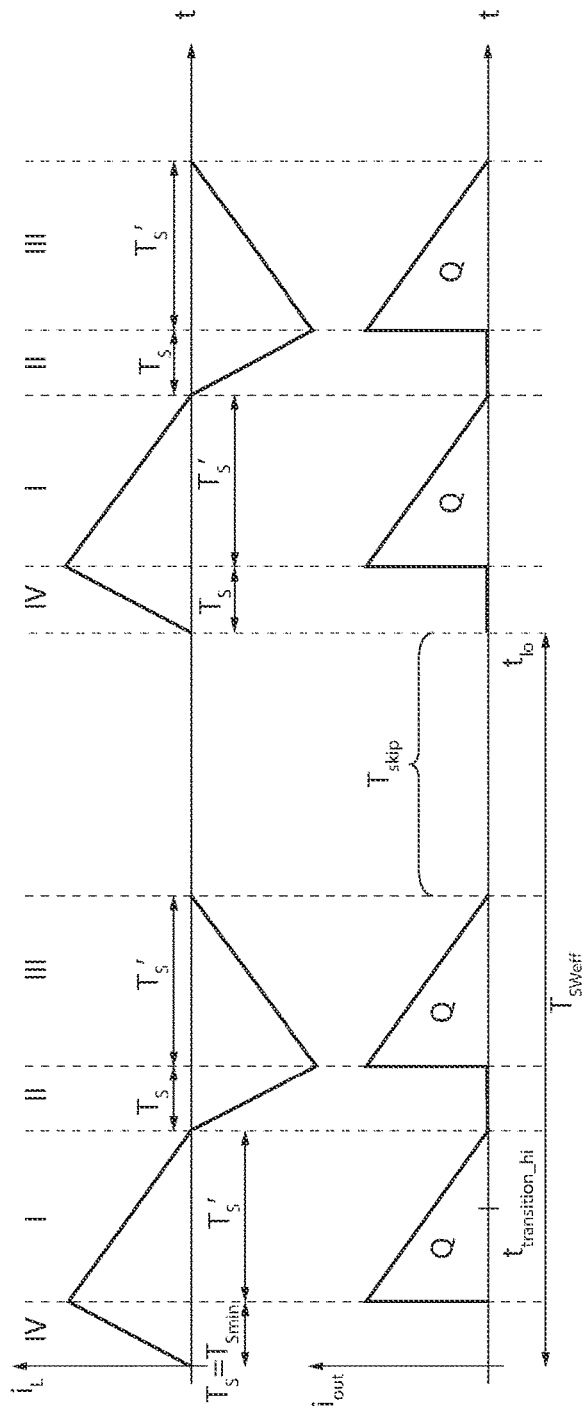
FIGS. 8A and 8B show time plots of currents, during corresponding operating conditions.
Figure 8B:
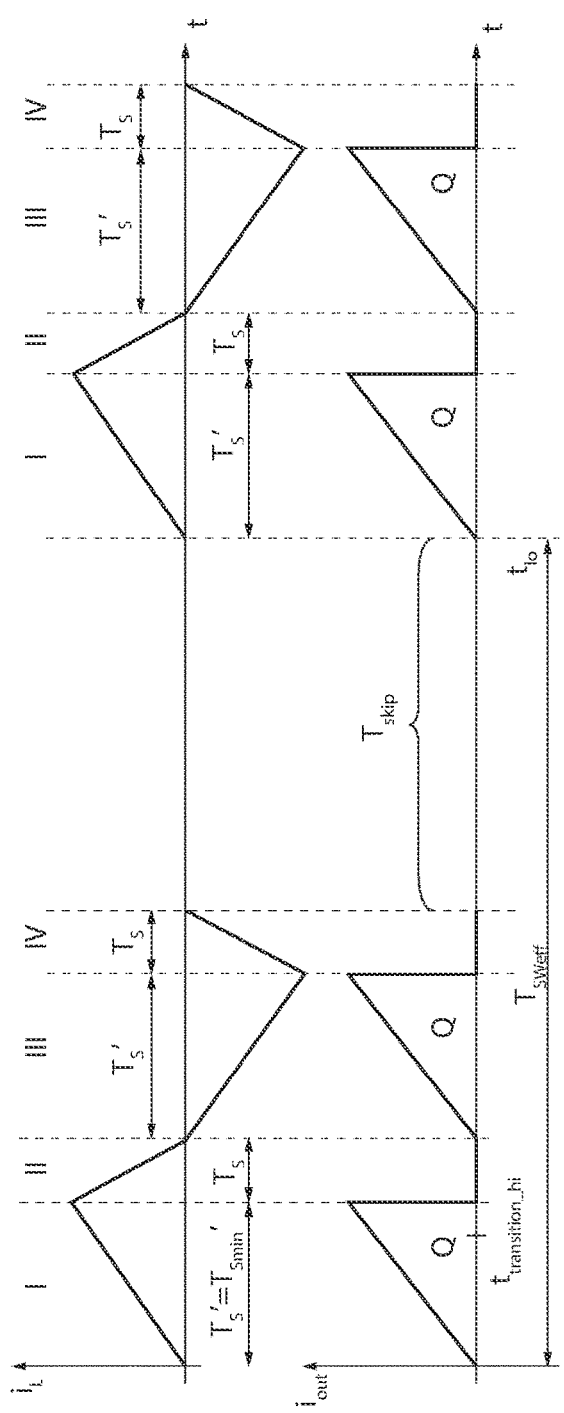

As an example, FIG. 8A refers to the case $V_{out} > V_{in}/2$, with time instant $t_{transition\_hi}$ (only one indicated in FIG. 8A) falling within a first phase. In this embodiment, the execution of the phase sequence is suspended after the execution of a whole pulse, i.e. at the second edge of the signal sZCD (not shown in FIG. 8A) that follows the time instant $t_{transition\_hi}$. The same applies in the case shown in FIG. 8B, which refers to the case $V_{out} < V_{in}/2$.

In addition, referring again, as an example, to FIG. 7, depending on the amplitude of the hysteresis, i.e. the difference $V_{out\_hi} - V_{out\_lo}$, the logic stage 24 may be forced to execute a certain number of pulses/semi-pulses before re-entering the pulse-skipping mode. Put in other words, referring as an example to the second semi-pulse shown in FIG. 7, the condition $v_{out} = V_{out\_hi}$ cannot be met during the third phase, if the difference $V_{out\_hi} - V_{out\_lo}$ is too high with respect to the ripple $\Delta V_{pp}$; in this case, the condition $v_{out} = V_{out\_hi}$ is met in a following phase.

In that concerns the resumption of the execution of the phase sequence, it is also possible that the logic stage 24 resumes the execution at a time instant different from the time instant $t_{lo}$, such as a time instant synchronized with an inner clock (not shown) generated by the control module 10. As an example, the resumption of the execution of the phase sequence may occur at the first edge of the inner clock that follows the time instant $t_{lo}$.

It has further to be noted that the above description applies also in case the operational transconductance amplifier 12 is configured so that at steady-state the average output voltage $V_{out}$ is greater than the output reference voltage $V_{out\_ref}$, so that the control voltage $v_c$ is lower than the voltage vc_dc. Also, in this case, $V_{out\_hi} > V_{out\_lo} > V_{out\_ref}$.

Referring again to FIG. 4, the control module 10 may comprise a charge-control circuit 50, which include a first and a second charge-control transistor 52, 54. The first charge-control transistor 52 is a N-MOS transistor with drain set to the input voltage $V_{in}$ and source terminal connected to the source terminal of the second charge-control transistor 54, which is a P-MOS transistor and has a drain terminal connected to ground. The source terminals of the first and the second charge-control transistor 52, 54 are connected to the first intermediate node $N_1$.

The logic stage 24 may activate the charge-control circuit 50 during the periods $T_{skip}$, by providing on the gate terminals of the first and the second charge-control transistor 52, 54 a voltage VGH and, respectively, a voltage VGL, and by turning on the fourth transistor $S_4$, whereas the first, the second and the third transistor $S_1$, $S_2$, $S_3$ are off. Therefore, by designating as VTH and |VTL| the threshold of the first charge-control transistor 52 and, respectively, the modulus of the threshold of the second charge-control transistor 54, the voltage $V_{C_r}$ on the capacitor $C_r$ is forced to stay between the voltage VGH-VTH and the voltage VGL+|VTL|. Assuming VGH=VGL=$V_{in}$/2, the charge-control circuit 50 keeps the voltage $V_{C_r}$ close to the voltage $V_{in}$/2. In facts, if the voltage $V_{C_r}$ falls below the voltage VGH-VTH, the first charge-control transistor 52 turns on and couples the capacitor $C_r$ to the input voltage $V_{in}$, while the second charge-control transistor 54 is off; on the contrary, if the voltage $V_{C_r}$ overcomes the voltage VGL+|VTL|, the second charge-control transistor 54 turns on and couples the capacitor $C_r$ to the ground, while the first charge-control transistor 52 is off. The voltages VGH and VGL may be obtained through a divider (not shown) connected between the input voltage $V_{in}$ and the ground.

When the control module 10 operates in the normal mode, the logic stage 24 keeps the charge-control circuit 50 off, as an example by setting VGH=0V and VGL=$V_{in}$.

In practice, the charge-control circuit 50 is configured to keep the voltage on the capacitor $C_r$ close to the voltage $V_{in}$/2 also during the periods $T_{skip}$. In the absence of the charge-control circuit 50, during the periods $T_{skip}$, the capacitor $C_r$ could discharge; therefore, assuming as an example the case $V_{out}$<$V_{in}$/2, the slopes of the curves shown in FIG. 3A could differ. In particular, the slopes of the current $i_L$ in the first and the third phase would rise, thereby causing an increase of the charge Q and thus of the ripple on the output voltage $v_{out}$.

In addition, the logic stage 24 may activate the charge-control circuit 50 at start-up, so as to reduce the voltage on the inductor $L_r$ and, as a consequence, to reduce the start-up overcurrent.

In any case, the charge-control circuit 50 is optional and may be added to any of the embodiments; however, for the sake of brevity, its possible presence won't be further mentioned in this description.

From a practical point of view, as shown in FIG. 4, the control module 10 may be integrated within a single semiconductor die 29 along with the first, the second, the third and the fourth transistor $S_1$, $S_2$, $S_3$, $S_4$. The inductor $L_r$, the capacitor $C_r$ and the output capacitor $C_o$ may be arranged outside the die 29, though embodiments are possible (not shown) in which also the inductor $L_r$ and the capacitor $C_r$ are integrated in the die 29. Similarly, embodiments are possible in which the first, the second, the third and the fourth transistor $S_1$, $S_2$, $S_3$, $S_4$ are arranged outside the die 29.

Figure 9:
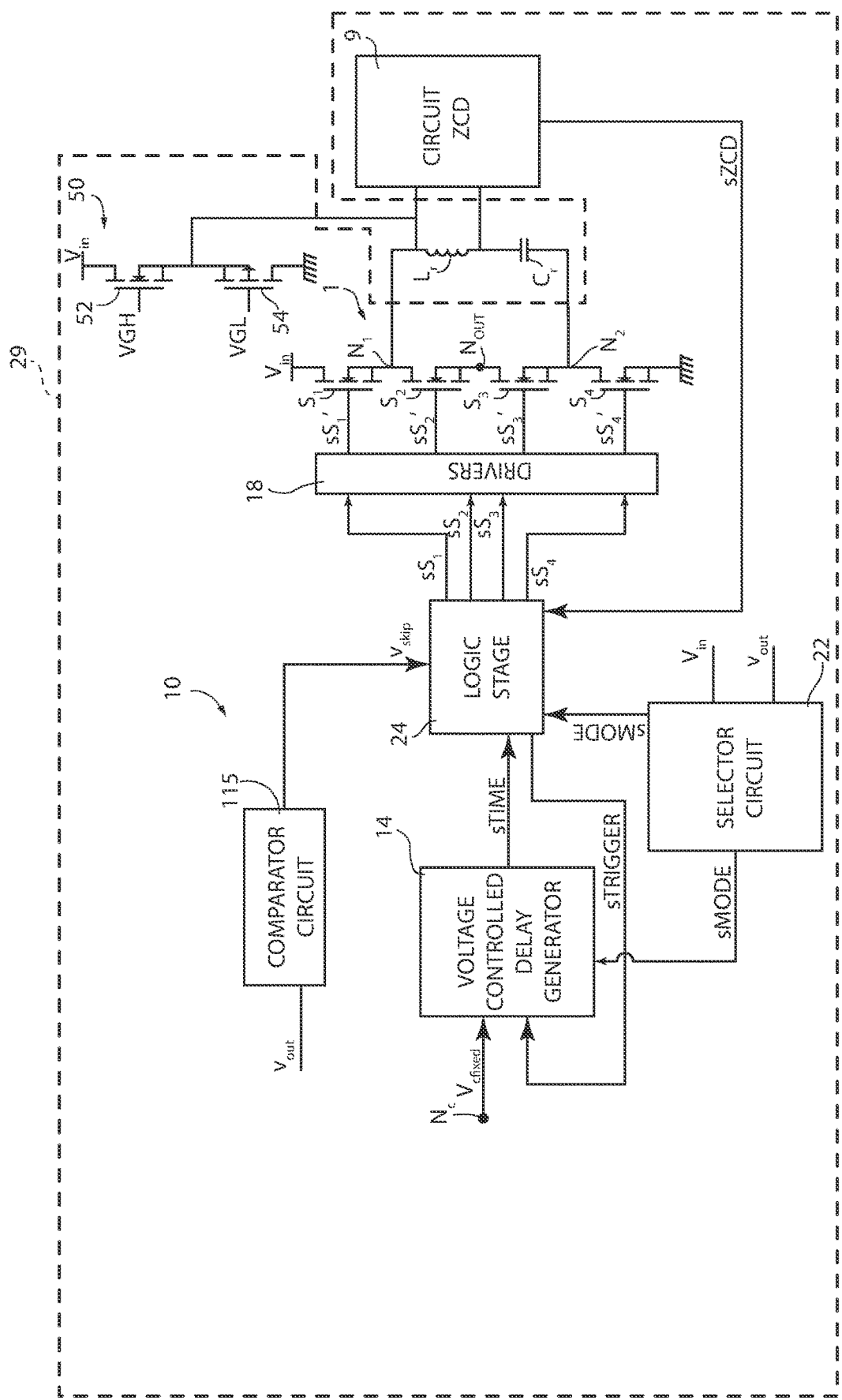

FIG. 9 shows a further embodiment, hereinafter described with reference to the differences over the embodiment show in FIG. 4.

In detail, the control node $N_c$ is set (e.g., by a bandgap circuit, not shown) to a fixed voltage $V_{cfixed}$, which is received by the voltage controlled delay generator 14, along with the signals sTRIGGER and sMODE. Therefore, the signal sTIME generated by the voltage controlled delay generator 14 represents a delay T* which is a fixed value, which depends on whether $V_{out}$<$V_{in}$/2 or $V_{out}$>$V_{in}$/2. Put in other words, the durations $T_S'$ and $T_S$ are fixed.

In addition, the comparator circuit (here designated by 115) receives the output voltage $v_{out}$ and is configured to compare the output voltage $v_{out}$ with the first and the second output threshold $V_{out\_hi}$, $V_{out\_lo}$. In particular, the comparator circuit 115 generates a rising edge of the signal $v_{skip}$ whenever the output voltage $v_{out}$ overcomes the first output threshold $V_{out\_hi}$; in addition, the comparator circuit 115 generates a falling edge of the signal $v_{skip}$ whenever the output voltage $v_{out}$ drops below the second output threshold $V_{out\_lo}$.

The functioning of the embodiment of FIG. 9 is the same as the one of FIG. 4, but for the fact that the current $I_{out}$ (see the above equation (1)), which is a function of the fixed voltage $V_{cfixed}$, has to be greater than, or equal to, the current $I_{LOAD}$. As an example, the fixed voltage $V_{cfixed}$ may be equal to the voltage $V_{cmin}$, in which case the current $I_{LOAD}$ is equal to $I_{LOAD\_MIN}$, which represents the maximum current that can be regulated, because the voltage controlling the voltage controlled delay generator 14 is fixed. Therefore, if $I_{LOAD}$>$I_{LOAD\_MIN}$, the current $I_{out}$ is still equal to the current $I_{LOAD\_MIN}$, and the output voltage $v_{out}$ drops to zero.

Also, the embodiment of FIG. 9 allows to implement a lower bound for durations $T_S'$ and $T_S$, as well a mechanism that provides for a reduction of the effective switching frequency, without a clamping circuit, nor a proportional integrative controller.

Figure 10:
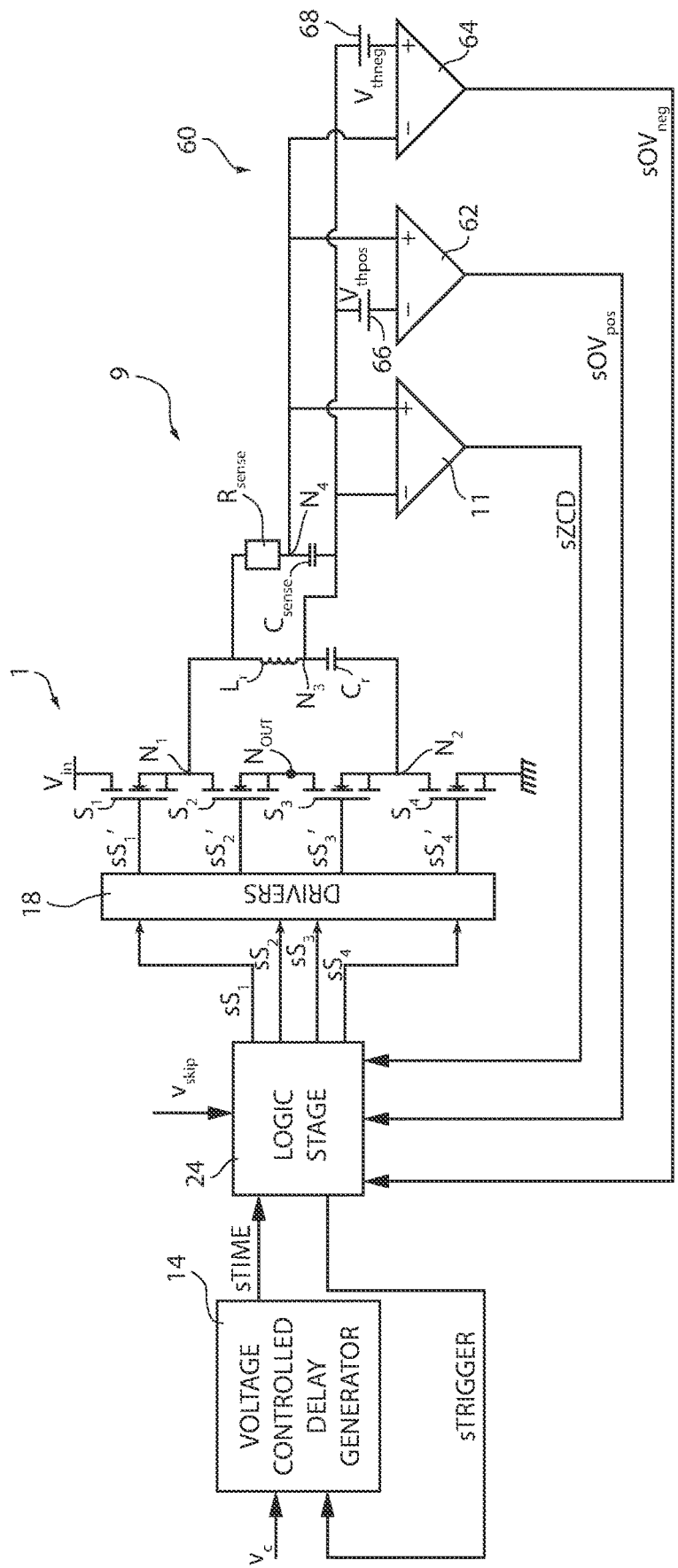

FIG. 10 shows a further embodiment, which is the same as the one of FIG. 4, but it does not include the selector circuit 22. Furthermore, for the sake of simplicity, FIG. 10 does not show the operational transconductance amplifier 12, the compensation network 15 and the (possible) charge-control circuit 50. Furthermore, the voltage controlled delay generator 14 and the logic stage 24 are configured to operate in the same way as described above for the case sMODE='0'; put in other words, the voltage controlled delay generator 14 and the logic stage 24 are configured to operate in the scenario $V_{out}$>$V_{in}$/2.

This having been said, the current limiter 60 is connected in parallel to the ZCD circuit 9. As an example, the current limiter 60 includes a first and a second operational amplifier 62, 64, hereinafter referred to as, respectively, the first and the second limiter amplifier 62, 64. Furthermore, the current limiter 60 includes a first and a second voltage generator 66, 68, which generate respectively a positive voltage $V_{thpos}$ and a positive voltage $V_{thneg}$. Furthermore, in the following reference will be made to the third intermediate node $N_3$ to designate the node interposed between the inductor $L_r$ and the capacitor $C_r$; moreover, reference will be made to the fourth intermediate node $N_4$ to designate the node interposed between the sense resistor $R_{sense}$ and the sense capacitor $C_{sense}$. The third and the fourth intermediate node $N_3$, $N_4$ are thus connected to the negative and, respectively, the positive input terminal of the amplifier 11.

The positive and negative terminals of the first voltage generator 66 are respectively connected to the negative input terminal of the first limiter amplifier 62 and the third intermediate node $N_3$, the positive input terminal of the first limiter amplifier 62 being connected to the fourth intermediate node $N_4$.

The positive and negative terminals of the second voltage generator 68 are respectively connected to the third intermediate node $N_3$ and the positive input terminal of the second limiter amplifier 64, the negative input terminal of the second limiter amplifier 64 being connected to the fourth intermediate node $N_4$.

Bearing in mind that, as explained before, the voltage on the sense capacitor $C_{sense}$ has the same trend over time as the current $i_L$, the first and the second limiter amplifier 62, 64 function in the same way as the amplifier 11 and generate, respectively, a signal $sOV_{pos}$ and a signal $sOV_{neg}$. In particular, the signal $sOV_{pos}$ is equal to '1' or '0' when the current $i_L$ is respectively greater or lower than a current $I_{max}$, whose value is equal to $V_{thpos}*(R_{sense}*C_{sense})/L_r$; the signal $sOV_{neg}$ is equal to '1' or '0' when the current $i_L$ is respectively lower or greater than a current $I_{min}$, whose value is equal to $-V_{thneg}*(R_{sense}*C_{sense})/L_r$. To this regard, the voltages $V_{thpos}$ and $V_{thneg}$ may be comprised in the range 10 mV-1V.

In use the first and the second limiter amplifier 62, 64 are configured to detect the occurrence of, respectively, a positive overcurrent and a negative overcurrent. The signals $sOV_{pos}$ and $sOV_{neg}$ are provided to the logic stage 24.

In practice, though the control module 10 shown in FIG. 10 is configured to operate in the scenario $V_{out}>V_{in}/2$, it may operate also when $V_{out}<V_{in}/2$; this latter situation may temporarily occur, as an example, at the start-up.

Figure 11:
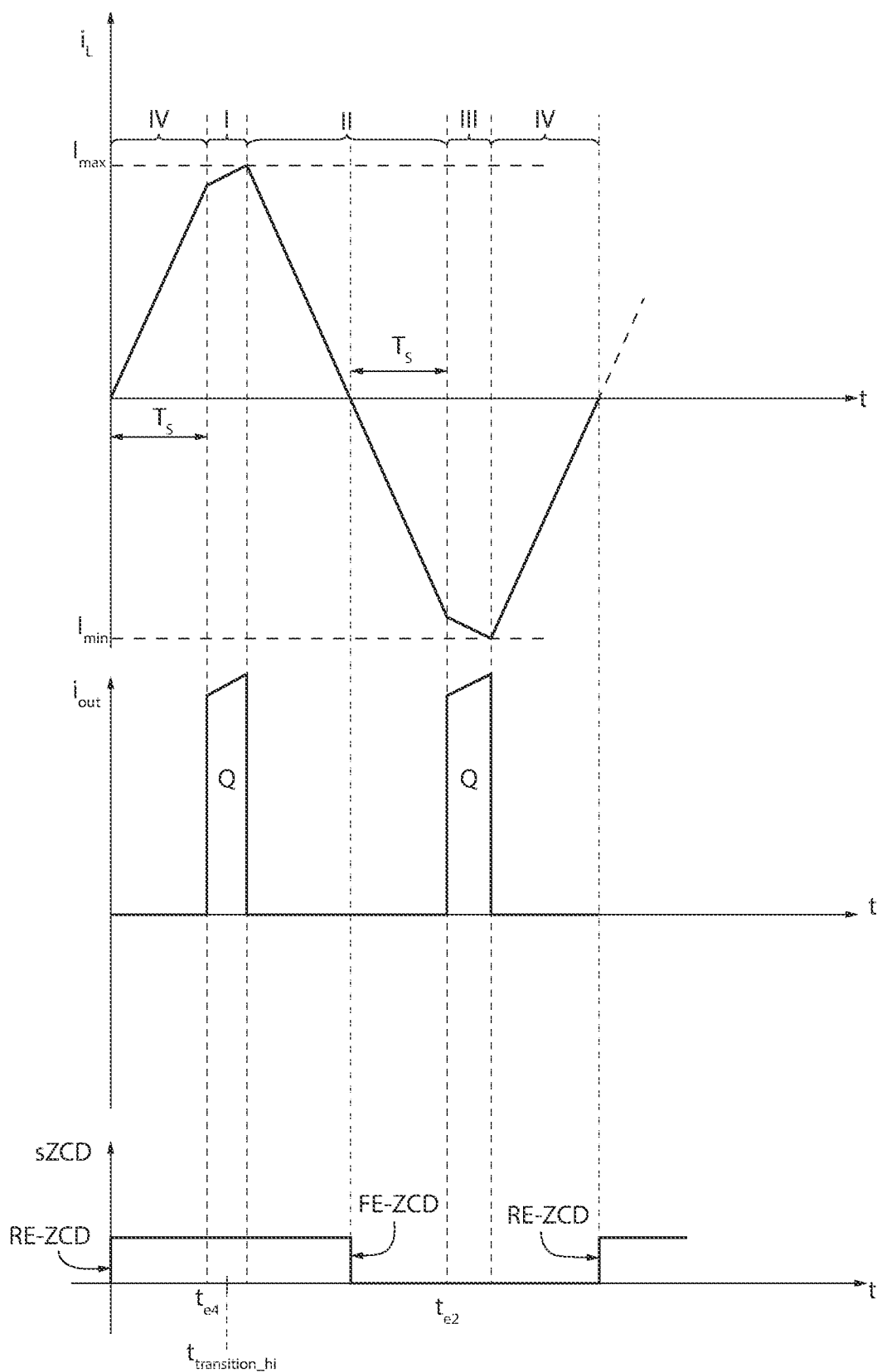

In particular, when $V_{out}<V_{in}/2$, in normal mode the current $i_L$ has the trend over time shown in FIG. 11, which differs from the trend shown in FIG. 3B. In facts, during the first phase, the current $i_L$ rises, as opposed to decreasing, because the quantity $[(V_{in}/2)-V_{out}]/L$ is positive; furthermore, during the third phase, the current $i_L$ decreases, as opposed to rising, because the quantity $[V_{out}-(V_{in}/2)]/L$ is negative.

In particular, the logic stage 24 is configured so that the first phase extends from the end of the preceding fourth phase till the time instant in which any of the following conditions occur: the current $i_L$ reaches the zero value, as indicated by the signal sZCD, or $i_L=I_{max}$, as indicated by the signal $sOV_{pos}$.

The second phase extends from the end of the first phase till a time instant $t_{e2}$, which is delayed by a delay equal to the duration $T_S$ from the falling edge FE-ZCD of the signal sZCD that follows the end of the first phase.

The third phase extends from the end of the preceding second phase till the time instant in which any of the following conditions occur: the current $i_L$ reaches the zero value, as indicated by the signal sZCD, or $i_L=I_{min}$, as indicated by the signal $sOV_{neg}$.

The fourth phase extends from the end of the preceding third phase till a time instant $t_{e4}$, which is delayed by a delay equal to the duration $T_S$ from the rising edge RE-ZCD of the signal sZCD that follows the end of the third phase.

In practice, the control module 10 makes up for the absence of the selector circuit 22 by limiting the current $i_L$, when $V_{out}<V_{in}/2$, in order to prevent the voltage on the capacitor $C_r$ and the current $i_L$ from rising too much, in which case it would take much time for the current $i_L$ to get back to zero, thereby causing a long charge of the capacitor $C_r$.

Furthermore, referring to the situation shown in FIG. 11, also in this case the execution of the phase sequence can be suspended when the current $i_L$ is null. As an example, in case the signal $v_{skip}$ goes to '1' in a time instant $t_{transition\_hi}$ that falls between the rising edge RE-ZCD and the falling edge FE-ZCD of the signal sZCD (i.e., during the first phase or a first part of the fourth phase, with positive current $i_L$, or a first part of the second phase, with positive current $i_L$), the phase sequence can be suspended at the following falling edge FE-ZCD of the signal sZCD, which falls within the second phase, i.e. after the execution of the abovementioned first part of the second phase; furthermore, the phase sequence will be resumed by carrying out a second part of the second phase, with duration equal to the duration $T_S$ and negative current $i_L$. In case (not shown) the signal $v_{skip}$ goes to '1' in a time instant that falls during the second part of the second phase or the third phase or a second part of the fourth phase, this latter featuring negative current $i_L$, the phase sequence can be suspended at the following rising edge RE-ZCD of the signal sZCD, which falls within the fourth phase, i.e. after the execution of the second part of the fourth phase; furthermore, the phase sequence will be resumed by carrying out the first part of the fourth phase, with duration equal to the duration $T_S$ and positive current $i_L$.

Figure 12:
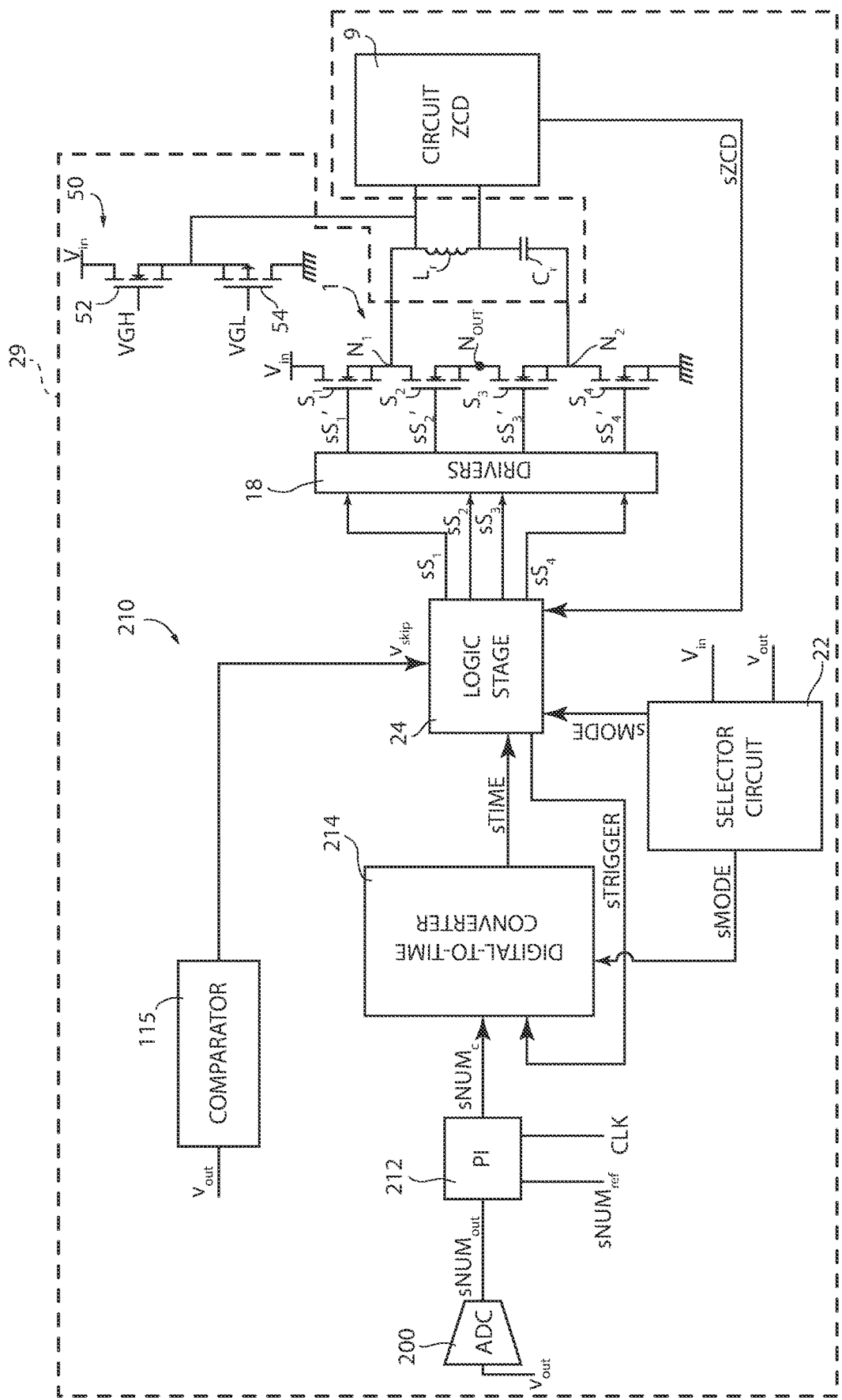

FIG. 12 shows a further embodiment, which differs from the one of FIG. 4 in that the clamping circuit 22, the operational transconductance amplifier 12 and the compensation network 15 are absent. Furthermore, the control module (here designated by 210) includes an analog-to-digital converter (ADC) 200, a proportional integrative controller 212, a digital-to-time converter 214 and the comparator circuit 115.

The input of the analog-to-digital converter 200 is connected to the output node $N_{OUT}$, in order to receive the output voltage $v_{out}$. The analog-to-digital converter 200 converts the output voltage $v_{out}$ into a digital signal $sNUM_{out}$, which represents a corresponding numerical value $NUM_{out}$.

The proportional integrative controller 212 receives the signal $sNUM_{out}$, a digital signal $sNUM_{ref}$ and a clock signal CLK; as an example, the digital signal $sNUM_{ref}$ and the clock signal CLK may be generated, respectively, by a reference generator and a timing circuit of the control module 210, not shown.

The signal $sNUM_{ref}$ represents a corresponding numerical value $NUM_{ref}$. The numerical value $NUM_{ref}$ may be equal, as an example, to the numerical value that would be generated by the analog-to-digital converter 200 if this latter received at input the output reference voltage $V_{out\_ref}$.

The clock CLK provides the timing to the proportional integrative controller 212, which generates a control signal $sNUM_c$ of the digital type, which represents a corresponding numerical value $NUM_c$ and is provided to the digital-to-time converter 214 along with the abovementioned signals sTRIGGER and sMODE.

In detail, by referring to $NUM_{err}$ to designate $NUM_{ref}-NUM_{out}$ and by adopting the symbol 'j' to index the samples of $NUM_{err}$ and $NUM_c$, $NUM_c(j)$ is set equal to the greater of a threshold value $NUM_{cmin}$ and:

$$K_{prop}*NUM_{err}(j)+K_{int}*\text{sum}_{u=0,j}[NUM_{err}(u)] \quad (8)$$

wherein: "sum" represents the sum of the corresponding addends, which are indexed by the index $u=0, 1, \ldots, j$; $K_{prop}$ and $K_{int}$ are positive constants; $NUM_{err}(j)=NUM_{ref}-NUM_{out}(j)$.

As an example, the sampling period of the signal $sNUM_{out}$ and of the control signal $sNUM_c$ may be equal to the period of the clock signal CLK. Furthermore, the equation (8) may be modified to limit the number of previous samples which are considered to compute the third addend.

In practice, the proportional integrative controller 212 implements a numerical limiting mechanism equivalent to the analog one of the embodiments of FIG. 4, this latter being based on the voltage $V_{cmin}$.

The digital-to-time converter 214 is configured to generate the signal sTIME so that the delay T* represented by the signal sTIME is equal $k_{DTC}*NUM_c(j)$, wherein $k_{DTC}$ is a constant which is a function of the period of the clock signal CLK and depends on the value of the signal sMODE. As an example, $k_{DTC}$ may be equal to 1/(MULT*Tclock), with Tclock representing the period of the clock signal CLK and MULT assuming a first or a second predetermined value, respectively when sMODE is equal to '1' or '0'.

Basically, the digital-to-time converter 214 converts a number into a delay; to this end, it may be formed by a respective counter which is updated with a high-frequency clock (i.e., with a clock having a frequency higher than the frequency of the clock signal CLK), the counter being compared with a corresponding threshold which depends on $NUM_c(j)$. As an example, at each rising edge of the signal sTRIGGER, a falling edge of the signal sTIME is generated and the counter is reset; a corresponding rising edge of the signal sTIME is then generated when the counter reaches a threshold that is equal to $NUM_c(j)$. In any case, the technical implementation of the digital-to-time converter 214 is irrelevant for the implementation of various embodiments.

The signal sTIME is provided to the logic stage 24, along with the signal $v_{skip}$, which is generated by the comparator circuit 115 in the same way described with reference to FIG. 9, namely by comparing the output voltage $v_{out}$ with the first and the second output threshold $V_{out\_hi}$, $V_{out\_lo}$.

In this embodiment, $I_{LOAD\_MIN}$ represents the value of the current $I_{LOAD}$ at steady-state such that $NUM_c(j)=NUM_{cmin}$. Therefore, in use, if the current $I_{LOAD}$ drops below the value $I_{LOAD\_MIN}$, the proportional integrative controller 212 sets $NUM_c(j)=NUM_{cmin}$. As a consequence, the current $I_{out}$ becomes greater than the current $I_{LOAD}$, and the output voltage $v_{out}$ rises as discussed with reference to FIGS. 6 and 7. $NUM_{out}$ replicates the output voltage $v_{out}$, so, when $I_{LOAD} \geq I_{LOAD\_MIN}$, $NUM_{out}$ is approximately equal to $NUM_{ref}$; when $I_{LOAD} < I_{LOAD\_MIN}$, $NUM_{out}$ rises in the same way as the output voltage $v_{out}$.

The logic stage 24 operates in the same manner described with reference to the previous embodiments. Therefore, the embodiment shown in FIG. 12 represents a partially numerical implementation of the embodiment shown in FIG. 4. The same considerations on possible variations of the timing of the stop/resumption of the execution of the phase sequence apply. Furthermore, embodiments are possible which are the same as the one shown in FIG. 12, but do not include the selector circuit 22, in which case the current limiter 6o may be included.

Finally, it is clear that, as mentioned previously, modifications and variations may be made to what has been described and illustrated herein, without departing from the scope of the present invention, as defined in the annexed claims.

For instance, the switches of the converter may be formed by transistors of a different type with respect to the type of the transistors mentioned before. In addition, the first, the second, the third and the fourth transistor $S_1$, $S_2$, $S_3$, $S_4$ may be formed by different types of transistors; as an example, embodiments are possible in which the first and the third transistor $S_1$, $S_3$ are P-MOS transistors, whereas the second and the fourth transistor $S_2$, $S_4$ are N-MOS transistors.

The compensation network 15 may include further electrical components, such as an additional capacitor connected in parallel to the series circuit formed by the resistor $R_c$ and the capacitor $C_c$, in order to reduce the loop gain at high frequencies and improve stability.

In addition, the compensation network may be such that the relationship between the control voltage $v_c$ and the error voltage $v_{err}$ is not of the proportional and integrative type. The same applies in case of the above equation (8). From a more general standpoint, by referring to the control quantity to designate either i) the control voltage $v_c$ or ii) the numerical value $NUM_c$, and referring to the error quantity to designate either i) the error voltage $v_{err}$ or ii) $NUM_{err}$, the dependence of the control quantity on the error quantity may be different from the proportional integrative dependence.

Similarly, the dependence of the delay T* on the control voltage $v_c$ and, respectively, the numerical value $NUM_c$ may be not linear, but generically monotonically increasing.

Instead of providing for a voltage controlled delay generator capable of generating, given any value of the control voltage $v_c$, different values of the delay T* for the scenarios $V_{out} < V_{in}/2$ or $V_{out} > V_{in}/2$, it is possible do adapt the output dynamic range of the operational transconductance amplifier 12, based on whether $V_{out} < V_{in}/2$ or $V_{out} > V_{in}/2$, in order to generate, given any value of the error voltage $v_{err}$, a value of the control voltage $v_c$ which depends on whether $V_{out} < V_{in}/2$ or $V_{out} > V_{in}/2$; in this case, the voltage controlled delay generator may not have to operate in different manner based on whether $V_{out} < V_{in}/2$ or $V_{out} > V_{in}/2$.

Finally, instead of using the output voltage $v_{out}$ as a feedback quantity to generate the error quantity, it is possible to use feedback quantity $v_{out\_fb}$, which depends on the output voltage $v_{out}$ in a monotonic way, either increasing or decreasing; in particular, in case of decreasing dependence, the inputs of the operational transconductance amplifier 12 have to be inverted, to maintain a negative feedback. As an example, the feedback quantity $v_{out\_fb}$ may be obtained as a partition of the output voltage $v_{out}$, as an example by means of a resistive divider. The feedback quantity $v_{out\_fb}$ is fed to the operational transconductance amplifier 12 or the analog-to-digital converter 200.

Finally, it is possible for the dependence of the time delay T* to be monotonically decreasing, instead of monotonically increasing. In this case, referring as an example to the control module 10 shown in FIG. 4, the clamping circuit may be modified so as to be activated in case the control voltage $v_c$ tends to overcome a voltage $V_{cmax}$; furthermore, the output voltage $v_{out}$ and the output reference voltage $V_{out\_ref}$ are respectively provided on the positive and negative input terminals of the operational transconductance amplifier 12. The current $I_{LOAD\_MIN}$ represents thus the value of the current $I_{LOAD}$ such that the control voltage $v_c$ is equal to the voltage $V_{cmax}$; if $I_{LOAD} > I_{LOAD\_MIN}$, the control voltage $v_c$ is lower than the voltage $V_{cmax}$ and such that the corresponding value of the delay T* causes the current $I_{out}$ to be equal to the current $I_{LOAD}$. If $I_{LOAD} < I_{LOAD\_MIN}$, the control voltage $v_c$ is clamped to the voltage $V_{cmax}$ by the clamping circuit, so that the corresponding value of the delay T* causes the current $I_{out}$ to be greater than the current $I_{LOAD}$, and the output voltage $v_{out}$ rises as discussed with reference to FIGS. 6 and 7. Furthermore, the current $i_{clamp}$ has an opposite direction with respect to the one described before (i.e., it is drained by the clamping circuit from the control node $N_c$ instead of being injected), because it has to offset the operational transconductance amplifier 12, which tends to raise the control voltage $v_c$.

The same considerations apply, as an example, in case of the embodiment of FIG. 12: the dependence of the delay T* on the numerical value $NUM_c$ may be monotonically decreasing, instead of monotonically increasing, in which case the proportional integrative controller 212 may be modified so that $NUM_c(j)$ is set equal to the lower of a threshold value $NUM_{cmax}$ and the result of the above equation (8); furthermore, $NUM_{err}$ has to be modified into $NUM_{out} - NUM_{ref}$. $I_{LOAD\_MIN}$ represents the value of the current $I_{LOAD}$ at steady-state such that $NUM_c(j) = NUM_{cmax}$. Therefore, in use, if $I_{LOAD} > I_{LOAD\_MIN}$, $NUM_c(j)$ is lower than $NUM_{cmax}$ and such that the corresponding value of the delay T* causes the current $I_{out}$ to be equal to the current $I_{LOAD}$; if the current $I_{LOAD}$ drops below the value $I_{LOAD\_MIN}$, the proportional integrative controller 212 clamps $NUM_c(j)$ to $NUM_{cmax}$. As a consequence, the current $I_{out}$ becomes greater than the current $I_{LOAD}$, and the output voltage $v_{out}$ rises as discussed with reference to FIGS. 6 and 7.

What is claimed is:

1. A control module, for a resonant switched-capacitor converter comprising first, second, third, and fourth switches connected in cascade, wherein the first and second switches form a first inner node, the second and third switches form an output node configured to be coupled to a load and an output capacitor, and the third and fourth switches form a second inner node, the converter configured to receive an input voltage and generate an output voltage on the output node, and comprising a resonant series circuit, which is coupled to the first and second inner nodes and includes an inductor and a first capacitor, the control module comprising:
   a controller stage configured to control the first, second, third, and fourth switches so that the converter operates alternatively in:
      a first phase, in which the first and third switches are closed, and the second and fourth switches are open, so that an inductor current that flows through the inductor is coupled to the load;
      a second phase, in which the second and third switches are closed, and the first and fourth switches are open, so that the inductor current is decoupled from the load;
      a third phase, in which the second and fourth switches are closed, and the first and third switches are open, so that the inductor current is coupled to the load; and
      a fourth phase, in which the first and fourth switches are closed, and the second and third switches are open, so that the inductor current is decoupled from the load;
   an input stage configured to generate a first control signal indicating a control quantity;
   a delay stage configured to receive the first control signal and to generate a duration signal indicating a time quantity that depends on the control quantity according to a first function that is monotonically increasing or decreasing;
   a zero-crossing detection circuit coupled to the inductor and configured to generate a current signal indicating zero crossings of the inductor current;
   wherein the control quantity is fixed, or variable and depends on a difference between a reference quantity and a feedback quantity that depends on the output voltage;
   wherein the input stage is further configured, when the control quantity is variable, to clamp the control quantity to a control threshold in response to the control quantity reaching the control threshold, wherein the control threshold is a lower bound for the control quantity when the first function is monotonically increasing, or is an upper bound for the control quantity when the first function is monotonically decreasing;
   wherein the controller stage is further configured to:
      receive the current signal and the duration signal; and
      operate in a normal mode, in which the controller stage controls the first, second, third, and fourth switches to carry out a phase sequence by iterating pulses, each respective pulse including a respective first phase, a respective second phase, a respective third phase, and a respective fourth phase, the respective first, second, third and fourth phases having respective timings that depend on the zero crossings of the inductor current and on the time quantity, so that a duration of each pulse rises as the time quantity rises and the converter generates on the output node an average output current directed to the load and the output capacitor that depends on the time quantity according to a monotonically increasing second function, wherein the average output current is prevented from dropping below a minimum load current, which is a function of the control quantity when the control quantity is fixed, and of the control threshold, when the control quantity is variable, wherein the output voltage thereby tends to rise when the load drains a load current that is lower than the minimum load current;
   a comparison stage configured to generate a second control signal indicating time instants in which the output voltage reaches an upper voltage threshold and time instants in which the output voltage drops to a lower voltage threshold; and
   wherein the controller stage is further configured to:
      receive the second control signal;
      when the second control signal indicates that the output voltage has reached the upper voltage threshold, to switch from the normal mode to a pulse-skipping mode, in which the controller stage suspends execution of the phase sequence, thereby causing the output voltage to drop; and
      resume the execution of the phase sequence after the second control signal indicates that the output voltage has dropped to the lower voltage threshold.

2. The control module according to claim 1, wherein, after each time instant in which the output voltage reaches the upper voltage threshold, the controller stage is configured to suspend the execution of the phase sequence at a corresponding time instant that follows the time instant and in which the inductor current is null.

3. The control module according to claim 2, wherein the controller stage is configured to suspend the execution of the phase sequence at a first time instant that follows the time instant in which the output voltage reaches the upper voltage threshold and in which the inductor current is null.

4. The control module according to claim 1, wherein, when operating in the normal mode, the controller stage is configured to control the first, second, third, and fourth switches so as to carry out at least one of first and second phase sequences, the first phase sequence being formed by an iteration of first pulses, each first pulse being formed by a succession of the first, second, third, and fourth phases, the second phase sequence being formed by an iteration of second pulses, each second pulse being formed by a succession of the fourth, first, second, and third phases; the controller stage being further configured to set durations of the first, second, third and fourth phases so that:
   when the controller stage carries out the first phase sequence, each of the first and third phases starts when the inductor current is null and has a duration that is equal to the time quantity, each second phase lasting from an end of a previous first phase until when the inductor current goes to zero, each fourth phase lasting from an end of a previous third phase until when the inductor current goes to zero; and
   when the controller stage carries out the second phase sequence, the duration of the second and fourth phases is equal to the time quantity, each first phase lasting from an end of a previous fourth phase until when the inductor current goes to zero, each third phase lasting from an end of a previous second phase until when the inductor current goes to zero.

5. The control module according to claim 4, further comprising a selector circuit configured to detect whether an average of the output voltage is greater or lower than a discrimination voltage proportional to the input voltage and to control the controller stage so that the controller stage carries out either the first or second phase sequence, as a function of an outcome of the detection.

6. The control module according to claim 1, wherein, when operating in the normal mode, the controller stage is configured to control the first, second, third, and fourth switches so as to carry out a third phase sequence formed by an iteration of pulses, each pulse being formed by a succession of the fourth, first, second, and third phases; the controller stage being further configured to set durations of the first, second, third and fourth phases so that:
  each first phase lasts from an end of a previous fourth phase until when alternatively the inductor current goes to zero or the inductor current reaches an upper current threshold;
  each second phase starts at an end of a previous first phase and, alternatively, has a duration equal to the time quantity, if the previous first phase has ended with a null inductor current, or ends at a time instant delayed by a delay equal to the time quantity with respect to a first zero crossing of the inductor current following the end of the previous first phase, if the previous first phase has ended with inductor current equal to the upper current threshold;
  each third phase lasts from an end of a previous second phase until when alternatively the inductor current goes to zero or the inductor current drops to a lower current threshold; and
  each fourth phase starts at an end of a previous third phase and, alternatively, has the duration equal to the time quantity, if the previous third phase has ended with the null inductor current, or ends at a time instant delayed by a delay equal to the time quantity with respect to the first zero crossing of the inductor current following the end of the previous third phase, if the previous third phase has ended with inductor current equal to the lower current threshold.

7. The control module according to claim 1, further comprising a charge-control circuit configured to keep a voltage on the first capacitor of the resonant series circuit within a range including half the input voltage.

8. The control module according to claim 1, wherein the input stage comprises a transconductance amplifier and a compensation network, the transconductance amplifier being configured to generate a control voltage on the compensation network, as a function of the difference between a reference voltage and a feedback voltage that monotonically depends on the output voltage, the control quantity being variable and being formed by the control voltage.

9. The control module according to claim 1, wherein the input stage comprises:
  an analog-to-digital converter configured to generate a digital signal representing an output numerical value, which is a function of output voltage; and
  a numerical controller configured to receive the digital signal and to generate the first control signal so that it represents a numerical control value, which is a function of the difference between the output numerical value and a numerical reference, the control quantity being variable and being formed by the numerical control value.

10. The control module according to claim 1, wherein the comparison stage is configured to generate the second control signal so that it indicates the time instants in which a monitoring quantity reaches a respective first control threshold and the time instants in which the monitoring quantity reaches a respective second control threshold, the monitoring quantity depending monotonically on the output voltage.

11. A system comprising:
  a resonant switched-capacitor converter comprising:
    first, second, third, and fourth switches connected in cascade, wherein the first and second switches form a first inner node, the second and third switches form an output node configured to be coupled to a load and an output capacitor, and the third and fourth switches form a second inner node, the converter configured to receive an input voltage and generate an output voltage on the output node; and
    a resonant series circuit, which is coupled to the first and second inner nodes and includes an inductor and a first capacitor; and
  a control module comprising:
    a controller stage configured to control the first, second, third, and fourth switches so that the converter operates alternatively in:
      a first phase, in which the first and third switches are closed, and the second and fourth switches are open, so that an inductor current that flows through the inductor is coupled to the load;
      a second phase, in which the second and third switches are closed, and the first and fourth switches are open, so that the inductor current is decoupled from the load;
      a third phase, in which the second and fourth switches are closed, and the first and third switches are open, so that the inductor current is coupled to the load; and
      a fourth phase, in which the first and fourth switches are closed, and the second and third switches are open, so that the inductor current is decoupled from the load;
    an input stage configured to generate a first control signal indicating a control quantity;
    a delay stage configured to receive the first control signal and to generate a duration signal indicating a time quantity that depends on the control quantity according to a first function that is monotonically increasing or decreasing;
    a zero-crossing detection circuit coupled to the inductor and configured to generate a current signal indicating zero crossings of the inductor current;
    wherein the control quantity is fixed, or variable and depends on a difference between a reference quantity and a feedback quantity that depends on the output voltage;
    wherein the input stage is further configured, when the control quantity is variable, to clamp the control quantity to a control threshold in response to the control quantity reaching the control threshold, wherein the control threshold is a lower bound for the control quantity when the first function is monotonically increasing, or is an upper bound for the control quantity when the first function is monotonically decreasing;
    wherein the controller stage is further configured to:
      receive the current signal and the duration signal; and
      operate in a normal mode, in which the controller stage controls the first, second, third, and fourth switches to carry out a phase sequence by iterating pulses, each respective pulse including a respective first phase, a respective second phase, a respective third phase, and a respective fourth phase, the respective first, second, third and fourth phases having respective timings that depend on the zero crossings of the inductor current and on the time quantity, so that a duration of each pulse rises as the time quantity rises and the converter generates on the output node an average output current directed to the load and the output capacitor that depends on the time quantity according to a monotonically increasing second function, wherein the average output current is prevented from dropping below a minimum load current, which is a function of the control quantity when the control quantity is fixed, and of the control threshold, when the control quantity is variable, wherein the output voltage thereby tends to rise when the load drains a load current that is lower than the minimum load current;

a comparison stage configured to generate a second control signal indicating first time instants in which the output voltage reaches an upper voltage threshold and second time instants in which the output voltage drops to a lower voltage threshold; and wherein the controller stage is further configured to:
receive the second control signal;
when the second control signal indicates that the output voltage has reached the upper voltage threshold, to switch from the normal mode to a pulse-skipping mode, in which the controller stage suspends execution of the phase sequence, thereby causing the output voltage to drop; and
resume the execution of the phase sequence after the second control signal indicates that the output voltage has dropped to the lower voltage threshold.

12. The system according to claim 11, further comprising a charge-control circuit configured to keep a voltage on the first capacitor of the resonant series circuit within a range including half the input voltage.

13. The system according to claim 11, wherein the input stage comprises a transconductance amplifier and a compensation network, the transconductance amplifier being configured to generate a control voltage on the compensation network, as a function of the difference between a reference voltage and a feedback voltage that monotonically depends on the output voltage, the control quantity being variable and being formed by the control voltage.

14. The system according to claim 11, wherein the input stage comprises:
an analog-to-digital converter configured to generate a digital signal representing an output numerical value, which is a function of output voltage; and
a numerical controller configured to receive the digital signal and to generate the first control signal so that it represents a numerical control value, which is a function of the difference between the output numerical value and a numerical reference, the control quantity being variable and being formed by the numerical control value.

15. A method for controlling a resonant switched-capacitor converter comprising a first, a second, a third and a fourth switch connected in cascade, so that the first and second switches form a first inner node, the second and third switches form an output node configured to be coupled to a load and an output capacitor, and the third and fourth switches form a second inner node, the converter being configured to receive an input voltage and generate an output voltage on the output node and comprising a resonant series circuit, which is coupled to the first and second inner nodes and includes an inductor and a first capacitor, the method comprising:

controlling the first, second, third, and fourth switches so that the converter operates alternatively in:
a first phase, in which the first and third switches are closed, and the second and fourth switches are open, so that an inductor current that flows through the inductor is coupled to the load;
a second phase, in which the second and third switches are closed, and the first and fourth switches are open, so that the inductor current is decoupled from the load;
a third phase, in which the second and fourth switches are closed, and the first and third switches are open, so that the inductor current is coupled to the load; and
a fourth phase, in which the first and fourth switches are closed, and the second and third switches are open, so that the inductor current is decoupled from the load;

generating a first control signal indicating a control quantity; and based on the first control signal, generating a duration signal indicating a time quantity that depends on the control quantity according to a first function that is monotonically increasing or decreasing; and generating a current signal indicating zero crossings of the inductor current;

the control quantity being fixed, or variable and depending on a difference between a reference quantity and a feedback quantity that depends on the output voltage;

in response to the control quantity being variable, clamping the control quantity to a control threshold, in response to the control quantity reaching the control threshold, the control threshold being a lower bound for the control quantity, in response to the first function is monotonically increasing, or an upper bound for the control quantity, in response to the first function is monotonically decreasing; the method further comprising operating the converter in a normal mode, based on the current signal and the duration signal, the step of operating the converter in the normal mode comprising controlling the first, second, third, and fourth switches so as to carry out a phase sequence by iterating pulses including, each, a respective first phase, a respective second phase, a respective third phase and a respective fourth phase, the respective first, second, third and fourth phases having respective timings which depend on the zero crossings of the inductor current and on the time quantity, so that a duration of each pulse rises as the time quantity rises and the converter generates on the output node an average output current directed to the load and the output capacitor that depends on the time quantity according to a monotonically increasing second function, the average output current being prevented from dropping below a minimum load current, which is a function of the control quantity, in response to the control quantity being fixed, and of the control threshold, in response to the control quantity is variable, the output voltage thereby tending to rise in case the load drains a load current that is lower than the minimum load current; the method further comprising:

generating a second control signal indicating time instants in which the output voltage reaches an upper voltage threshold and time instants in which the output voltage drops to a lower voltage threshold; and in response to the second control signal indicating that the output voltage has reached the upper voltage threshold, switching from operating the converter in the normal mode to operating the converter in a pulse-skipping mode, the operating the converter in the pulse-skipping mode comprising suspending execution of the phase sequence, thereby causing the output voltage to drop; and resuming the execution of the phase sequence after the second control signal indicates that the output voltage has dropped to the lower voltage threshold.

16. The method according to claim 15, wherein, after each time instant in which the output voltage reaches the upper voltage threshold, execution of the phase sequence is suspended at a corresponding time instant that follows the time instant and in which the inductor current is null.

17. The method according to claim 16, wherein the execution of the phase sequence is suspended at a first time instant that follows the time instant in which the output voltage reaches the upper voltage threshold and in which the inductor current is null.

18. The method according to claim 15, wherein operating the converter in the normal mode comprises controlling the first, second, third, and fourth switches so as to carry out at least one of first and second phase sequences, the first phase sequence being formed by an iteration of first pulses, each first pulse being formed by a succession of the first, second, third, and fourth phases, the second phase sequence being formed by an iteration of second pulses, each second pulse being formed by a succession of the fourth, first, second, and third phases; the method comprising setting durations of the first, second, third, and fourth phases so that:

in response to the first phase sequence being carried out, each of the first and third phases starts in response to the inductor current being null and has a duration that is equal to the time quantity, each second phase lasting from an end of a previous first phase until the inductor current goes to zero, each fourth phase lasting from an end of a previous third phase until the inductor current goes to zero; and in response to the second phase sequence being carried out, the duration of the second and fourth phases is equal to the time quantity, each first phase lasting from an end of a previous fourth phase until the inductor current goes to zero, each third phase lasting from an end of a previous second phase until the inductor current goes to zero.

19. The method according to claim 18, further comprising detecting whether an average of the output voltage is greater or lower than a discrimination voltage proportional to the input voltage and carrying out either the first or second phase sequence, as a function of an outcome of the detection.

20. The method according to claim 15, wherein operating the converter in the normal mode comprises controlling the first, second, third, and fourth switches so as to carry out a third phase sequence formed by an iteration of pulses, each pulse being formed by a succession of the fourth, first, second, and third phases; the method comprising setting durations of the first, second, third and fourth phases so that:

each first phase lasts from an end of a previous fourth phase until the inductor current goes to zero or the inductor current reaches an upper current threshold;

each second phase starts at an end of a previous first phase and, alternatively, has a duration equal to the time quantity, in response to the previous first phase having ended with a null inductor current, or ends at a time instant delayed by a delay equal to the time quantity with respect to a first zero crossing of the inductor current following the end of the previous first phase, in response to the previous first phase having ended with inductor current equal to the upper current threshold;

each third phase lasts from an end of a previous second phase until the inductor current goes to zero or the inductor current drops to a lower current threshold; and each fourth phase starts at an end of a previous third phase and, alternatively, has the duration equal to the time quantity, in response to the previous third phase having ended with the null inductor current, or ends at a time instant delayed by a delay equal to the time quantity with respect to the first zero crossing of the inductor current following the end of the previous third phase, in response to the previous third phase having ended with inductor current equal to the lower current threshold.

* * * * *